(12) United States Patent
Reshadi et al.

(10) Patent No.: US 11,134,063 B2
(45) Date of Patent: **\*Sep. 28, 2021**

(54) PRESERVING SPECIAL CHARACTERS IN AN ENCODED IDENTIFIER

(71) Applicant: c/o Akamai Technologies, Inc., Cambridge, MA (US)

(72) Inventors: Mehrdad Reshadi, Sunnyvale, CA (US); Rajaram Gaunker, Santa Clara, CA (US); Hariharan Kolam, San Ramon, CA (US); Raghu Batta Venkat, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,645

(22) Filed: Dec. 9, 2016

(65) Prior Publication Data
US 2017/0171168 A1 Jun. 15, 2017

Related U.S. Application Data

(63) Continuation-in-part of application No. 15/079,396, filed on Mar. 24, 2016, now abandoned, and a continuation-in-part of application No. 14/206,344, filed on Mar. 12, 2014, now Pat. No. 10,148,735, application No. 15/374,645, filed on Dec. 9, 2016, which is a continuation-in-part of application No. PCT/US2016/053102, filed on Sep. 22, 2016, and a
(Continued)

(51) Int. Cl.
*H04L 29/06* (2006.01)
*H04L 9/06* (2006.01)
*G06F 21/64* (2013.01)
*H04L 9/32* (2006.01)
*H04L 29/08* (2006.01)

(52) U.S. Cl.
CPC .......... *H04L 63/0428* (2013.01); *G06F 21/64* (2013.01); *H04L 9/0643* (2013.01); *H04L 9/3236* (2013.01); *H04L 63/0414* (2013.01); *G06F 2221/2119* (2013.01); *H04L 63/168* (2013.01); *H04L 67/02* (2013.01)

(58) Field of Classification Search
CPC .................................................. H04L 63/0428
USPC ........................................................ 726/26
See application file for complete search history.

(56) References Cited

U.S. PATENT DOCUMENTS 6,564,257 B1 5/2003 Emens et al.
7,072,984 B1 * 7/2006 Polonsky ............ H04L 67/2823
709/246

(Continued)

FOREIGN PATENT DOCUMENTS

WO WO2006/085151 * 8/2006 ............... G06K 9/00
WO WO-2014191968 A1 12/2014
WO WO-20140191968 A1 12/2014

*Primary Examiner* — Dant B Shaifer Harriman
(74) *Attorney, Agent, or Firm* — David H. Judson

(57) ABSTRACT

A resource identifier to be encoded is detected. One or more special characters in the detected resource identifier are identified. The detected resource identifier is encoded at least in part by preserving the identified one or more special characters in a resulting encoded resource identifier corresponding to the detected resource identifier. The encoded resource identifier is utilized in place of the detected resource identifier.

16 Claims, 11 Drawing Sheets

Related U.S. Application Data continuation-in-part of application No. 15/079,396, filed on Mar. 24, 2016, now abandoned, and a continuation-in-part of application No. 14/206,344, filed on Mar. 12, 2014, now Pat. No. 10,148,735.

(60) Provisional application No. 62/279,468, filed on Jan. 15, 2016, provisional application No. 62/222,116, filed on Sep. 22, 2015.

(56) References Cited

U.S. PATENT DOCUMENTS

| | | | |
|---|---|---|---|
| 7,103,616 B1 | 9/2006 | Harmer | |
| 7,281,272 B1* | 10/2007 | Rubin | G06F 40/109 726/26 |
| 7,877,461 B1 | 1/2011 | Rimmer | |
| 8,020,193 B2* | 9/2011 | Bhola | H04L 63/1441 726/1 |
| 8,060,402 B1 | 11/2011 | Ranganath | |
| 8,307,099 B1 | 11/2012 | Khanna | |
| 8,626,659 B1* | 1/2014 | Bowman | G06Q 20/10 705/42 |
| 8,640,216 B2* | 1/2014 | Anderson | H04L 63/0272 726/11 |
| 8,819,817 B2* | 8/2014 | Croll | G06F 21/6263 726/22 |
| 8,892,687 B1 | 11/2014 | Call | |
| 8,925,054 B2* | 12/2014 | Mays | G06F 21/6254 726/6 |
| 9,177,335 B1 | 11/2015 | Carasso | |
| 10,558,798 B2* | 2/2020 | Weinstein | H04L 61/2007 |
| 2001/0037292 A1 | 11/2001 | Vogt | |
| 2002/0048269 A1 | 4/2002 | Hong | |
| 2003/0028863 A1 | 2/2003 | Reichenthal | |
| 2003/0115575 A1* | 6/2003 | Reyna | G06F 9/50 717/120 |
| 2004/0010601 A1 | 1/2004 | Afergan | |
| 2004/0049579 A1 | 3/2004 | Ims | |
| 2004/0054894 A1* | 3/2004 | Lambert | G06F 21/126 713/165 |
| 2004/0133848 A1 | 7/2004 | Hunt | |
| 2004/0205149 A1 | 10/2004 | Dillon | |
| 2005/0021862 A1 | 1/2005 | Schroeder | |
| 2005/0055437 A1 | 3/2005 | Burckart et al. | |
| 2005/0108517 A1 | 5/2005 | Dillon | |
| 2005/0216845 A1 | 9/2005 | Wiener | |
| 2005/0271282 A1* | 12/2005 | Reckers | H04L 63/0428 382/229 |
| 2006/0036875 A1 | 2/2006 | Karoubi | |
| 2006/0059550 A1 | 3/2006 | Kausik | |
| 2007/0005606 A1 | 1/2007 | Ganesan | |
| 2007/0084935 A1* | 4/2007 | Takei | G06K 19/06018 235/494 |
| 2007/0180503 A1* | 8/2007 | Li | H04L 67/02 726/5 |
| 2007/0239528 A1 | 10/2007 | Xie | |
| 2008/0004956 A1 | 1/2008 | Atherton | |
| 2008/0109553 A1 | 5/2008 | Fowler | |
| 2008/0112559 A1* | 5/2008 | Dyne | G09C 1/02 380/28 |
| 2008/0235368 A1 | 9/2008 | Nagaraj | |
| 2009/0158140 A1 | 6/2009 | Bauchot | |
| 2009/0193498 A1* | 7/2009 | Agarwal | H04L 63/105 726/1 |
| 2009/0193513 A1* | 7/2009 | Agarwal | H04L 63/166 726/15 |
| 2009/0204541 A1 | 8/2009 | Zhuk | |
| 2009/0300709 A1 | 12/2009 | Chen | |
| 2010/0100927 A1 | 4/2010 | Bhola et al. | |
| 2010/0145960 A1 | 6/2010 | Casteel | |
| 2010/0332993 A1 | 12/2010 | Bousseton | |
| 2011/0041153 A1 | 2/2011 | Simon | |
| 2011/0131567 A1 | 6/2011 | Tirk | |
| 2011/0179110 A1 | 7/2011 | Soloway | |
| 2011/0219057 A1 | 9/2011 | Scoda | |
| 2011/0246406 A1 | 10/2011 | Lahav | |
| 2011/0251928 A1* | 10/2011 | Buskirk | G06F 3/0486 705/27.2 |
| 2011/0264524 A1* | 10/2011 | Ewers | G06Q 30/0255 705/14.53 |
| 2011/0264787 A1 | 10/2011 | Mickens | |
| 2011/0296177 A1 | 12/2011 | Jamjoom | |
| 2012/0016933 A1 | 1/2012 | Day | |
| 2012/0030774 A1 | 2/2012 | Keith et al. | |
| 2012/0124372 A1 | 5/2012 | Dilley et al. | |
| 2012/0131349 A1* | 5/2012 | Layson | G06F 21/121 713/182 |
| 2012/0163598 A1 | 6/2012 | Hualin | |
| 2012/0324568 A1* | 12/2012 | Wyatt | G06F 21/51 726/13 |
| 2013/0039177 A1* | 2/2013 | Ozawa | H04W 4/18 370/230 |
| 2013/0041946 A1* | 2/2013 | Joel | H04L 67/42 709/203 |
| 2013/0144719 A1 | 6/2013 | Yeo | |
| 2013/0263182 A1 | 10/2013 | Ivy | |
| 2013/0275595 A1 | 10/2013 | Hansen | |
| 2014/0095870 A1* | 4/2014 | Dewan | H04L 63/0428 713/167 |
| 2014/0188839 A1* | 7/2014 | Nielsen | G06F 16/9535 707/711 |
| 2015/0058945 A1* | 2/2015 | Su | G06F 21/31 726/7 |
| 2015/0128280 A1* | 5/2015 | Messer | G06F 21/128 726/25 |
| 2015/0163087 A1 | 6/2015 | Conner | |
| 2015/0271188 A1 | 9/2015 | Call | |
| 2016/0028743 A1 | 1/2016 | Johns | |
| 2017/0026721 A1 | 1/2017 | Melenboim | |
| 2017/0169100 A1* | 6/2017 | Reshadi | H04L 63/0414 |
| 2017/0169124 A1* | 6/2017 | Reshadi | G06F 16/173 |
| 2017/0171168 A1* | 6/2017 | Reshadi | H04L 63/0428 |
| 2017/0206189 A1 | 7/2017 | Houle | |
| 2020/0145386 A1* | 5/2020 | Chulsky | H04L 43/0817 |

\* cited by examiner

PRESERVING SPECIAL CHARACTERS IN AN ENCODED IDENTIFIER

CROSS REFERENCE TO OTHER APPLICATIONS

This application claims priority to U.S. Provisional Patent Application No. 62/279,468 entitled PROTECTING CONTENT INTEGRITY filed Jan. 15, 2016 which is incorporated herein by reference for all purposes.

This application is a continuation-in-part of co-pending U.S. patent application Ser. No. 15/079,396 entitled PROTECTING CONTENT INTEGRITY filed Mar. 24, 2016, which claims priority to U.S. Provisional Patent Application No. 62/222,116 entitled DISABLING AD-BLOCKERS filed Sep. 22, 2015 and claims priority to U.S. Provisional Patent Application No. 62/279,468 entitled PROTECTING CONTENT INTEGRITY filed Jan. 15, 2016. U.S. patent application Ser. No. 15/079,396 is also a continuation-in-part of co-pending Ser. No. 14/206,344 entitled APPLICATION LAYER LOAD BALANCER filed Mar. 12, 2014, all of which are incorporated herein by reference for all purposes.

This application is a continuation-in-part of International (PCT) Application No. PCT/US16/53102 entitled PROTECTING CONTENT INTEGRITY filed Sep. 22, 2016, which claims priority to U.S. Provisional Patent Application No. 62/222,116 entitled DISABLING AD-BLOCKERS filed Sep. 22, 2015 and claims priority to U.S. Provisional Patent Application No. 62/279,468 entitled PROTECTING CONTENT INTEGRITY filed Jan. 15, 2016 and is a continuation-in-part co-pending U.S. patent application Ser. No. 15/079,396 entitled PROTECTING CONTENT INTEGRITY filed Mar. 24, 2016, which claims priority to U.S. Provisional Patent Application No. 62/222,116 entitled DISABLING AD-BLOCKERS filed Sep. 22, 2015 and claims priority to U.S. Provisional Patent Application No. 62/279,468 entitled PROTECTING CONTENT INTEGRITY filed Jan. 15, 2016. U.S. patent application Ser. No. 15/079,396 is also a continuation-in-part of co-pending Ser. No. 14/206,344 entitled APPLICATION LAYER LOAD BALANCER filed Mar. 12, 2014, all of which are incorporated herein by reference for all purposes.

BACKGROUND OF THE INVENTION

A web browser may comprise functionality that is configured to access and request resources embedded within a webpage to be rendered by the web browser. However, a content modifier such as a third party add-on of the web browser may be configured to modify, substitute or block one or more particular types of resources associated with the webpage prior to rendering by the web browser. Such content modification functionality may typically utilize a range of techniques to modify the webpage. These techniques include (i) adding content to the webpage prior to rendering by the web browser; (ii) removing content from the webpage prior to rendering by the web browser; (iii) blocking retrieval of content by the web browser prior to rendering by the web browser; (iv) substituting content associated with the webpage prior to rendering by the web browser; and (v) modifying one or more display attributes associated with content prior to rendering by the web browser. Typically, these modifications are performed automatically as a background process and without the knowledge or explicit consent of a user of the web browser or a publisher of the web content. Moreover, these modifications may negatively impact the functionality and aesthetics of the content, thereby compromising the integrity of the webpage.

BRIEF DESCRIPTION OF THE DRAWINGS

Various embodiments of the invention are disclosed in the following detailed description and the accompanying drawings.

DETAILED DESCRIPTION

Figure 1:
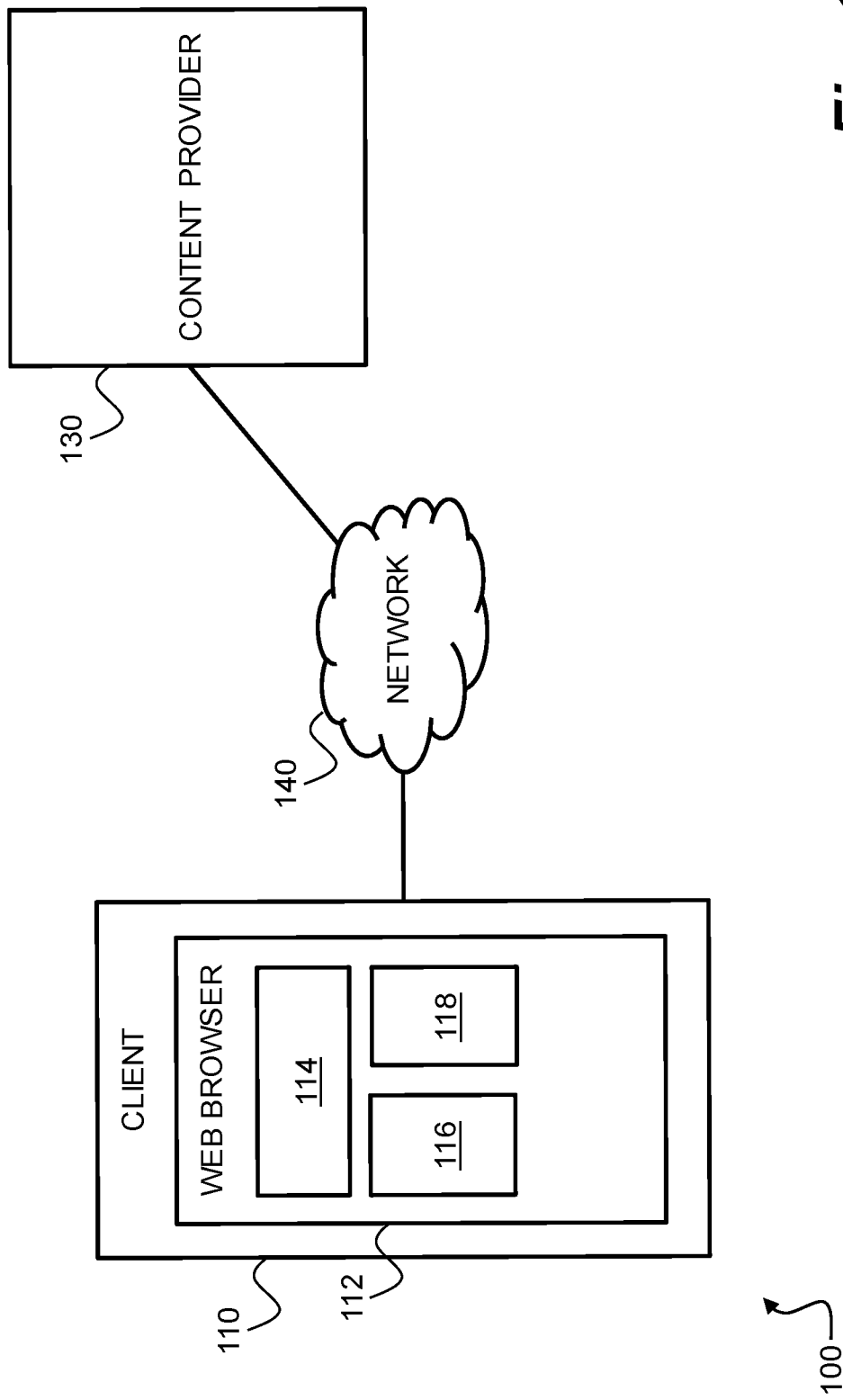
FIG. 1 is a schematic diagram showing an example of a system in accordance with an embodiment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Protecting content is disclosed. For example, integrity of web content is protected in a manner that reduces the likelihood the web content is altered prior to display to an end user. In some embodiments, an original content location address to be encoded is received. For example, the original content location address location is to be obfuscated to prevent content modifiers (e.g., content modifier/blocker provided by a third-party to modify/block content that was originally intended by an original publisher to be rendered to a user) from recognizing the original content location address as a location address to replace or block.

However, encoding and obfuscating the original location address not only obfuscates the location address from undesired third party content modifiers but also obfuscates it from internal code of the web content that may rely on the original characters included in the original location address. For example, portions of characters included in the location address may be extracted and utilized to resolve a relative location path specified relative to a reference path of a location address. When the relative location path (e.g., "../../file1.htm"—identifies "file1.htm" located two hierarchical levels up from a reference path) is applied to the path of the location address, a hierarchical structure of the path of the location address is determined by identifying special characters (e.g., "/") in the location address that identifies it structure, and the resulting resolved location address corresponding to the relative location path is generated based on the determined hierarchical structure of the location address. If the location address had been encoded to obfuscate even the included special characters that identify the structure of the location address, the relative location path would not be correctly resolved.

In some embodiments, one or more locations of one or more special characters (e.g., characters that separate logical components and define relationships of the logical components) in the original content location address are identified. For example, the special characters define a structure, a hierarchy, a format and/or components of the content location address are identified in the original content location address to identify formatting and structure of the original content location address to be preserved in an encoded form of the content location address. Examples of the special characters include: ".", ":", "/", "?", "&", "#" and "=". The original content location address is encoded at least in part by preserving the at least some of the identified special characters in a resulting encoded location address corresponding to the original content location address. For example, one or more of the identified special characters are included in the resulting encoded original content location address (e.g., included in the same relative order the included special characters were located in the original content location address) to preserve the structure of the original content location address in the resulting encoded original content location. The resulting encoded location address is provided to be utilized in place of the original content location address.

Certain embodiments described herein relate to controlling access to network resources. In particular, certain embodiments described herein provide techniques for protecting one or more portions of the content to prevent unauthorized modification by content modification functionality associated with the web browser, prior to retrieval of associated network resources. In this manner, rendering of the content may be controlled and the integrity of a webpage can be protected.

FIG. 1 is a schematic diagram showing an example of a system in accordance with an embodiment. The system 100 comprises a client device 110 and a content provider system 130, which are communicatively coupled through a network 140. The client device 110 is configured with a web browser 112 for retrieval and rendering of webpages from the content provider system 130. The client device 110 may comprise a laptop computer, a desktop computer, a tablet computer, a smartphone, or any other device capable of installing and running the web browser 112. The content provider system 130 may comprise a web server, such as an origin server or any other apparatus capable of serving webpages to the client device 110. The network 140 may comprise any combination of public or private networks, including intranets, local area networks (LANs), wide area networks (WANs), radio access networks (RANs), Wi-Fi networks and/or the Internet.

The web browser 112 is configured to receive a webpage definition 116 (e.g., web content) from the content provider system 130 for rendering and presentation of a corresponding webpage to a user of the client device 110. For example, the web browser 112 may retrieve the webpage definition 116 from the content provider system 130 by issuing one of more network requests according to the Hypertext Transfer Protocol (HTTP) (e.g., one or more GET requests) or any other suitable networking or Internet protocol. The webpage definition 116 may comprise a file formatted according to one or more mark-up languages, such as Hypertext Mark-up Language (HTML) and/or Extensible Mark-up Language (XML), etc. The webpage definition 116 may also comprise content in the form of dynamically executable code, defined in terms of one or more programming languages (e.g., JavaScript, JavaScript Object Notation (JSON), etc.), such as interpreted programming languages, scripting languages, managed programming languages, web programming languages, etc. The webpage definition 116 may also comprise content in the form of one or more display attributes, defined in a style sheet language such as the Cascading Style Sheets (CSS) language.

The webpage definition 116 may be associated with one or more resources to be obtained and/or rendered by the web browser 112. Examples of such resources include image files, script files, video files, audio files, Adobe Flash content, HTML5 content, other webpage files, and the like. Typically, the resources are stored in one or more repositories that are located remote from the client device 110 and are retrieved by the web browser 112 prior to rendering of the associated webpage, or portion thereof. The web browser 112 may locate and retrieve the one or more resources based on one or more respective resource identifiers associated with the webpage definition 116. Examples of a resource identifier include a Uniform Resource Identifier (URI), a Uniform Resource Locator (URL), a network path, a location address, a storage location and any other content identifier. The one or more resource identifiers may be included in the webpage definition 116 retrieved by the web browser 112 and/or generated dynamically in response to execution of executable code (e.g., JavaScript) included or referenced by the webpage definition 116.

Figure 2:
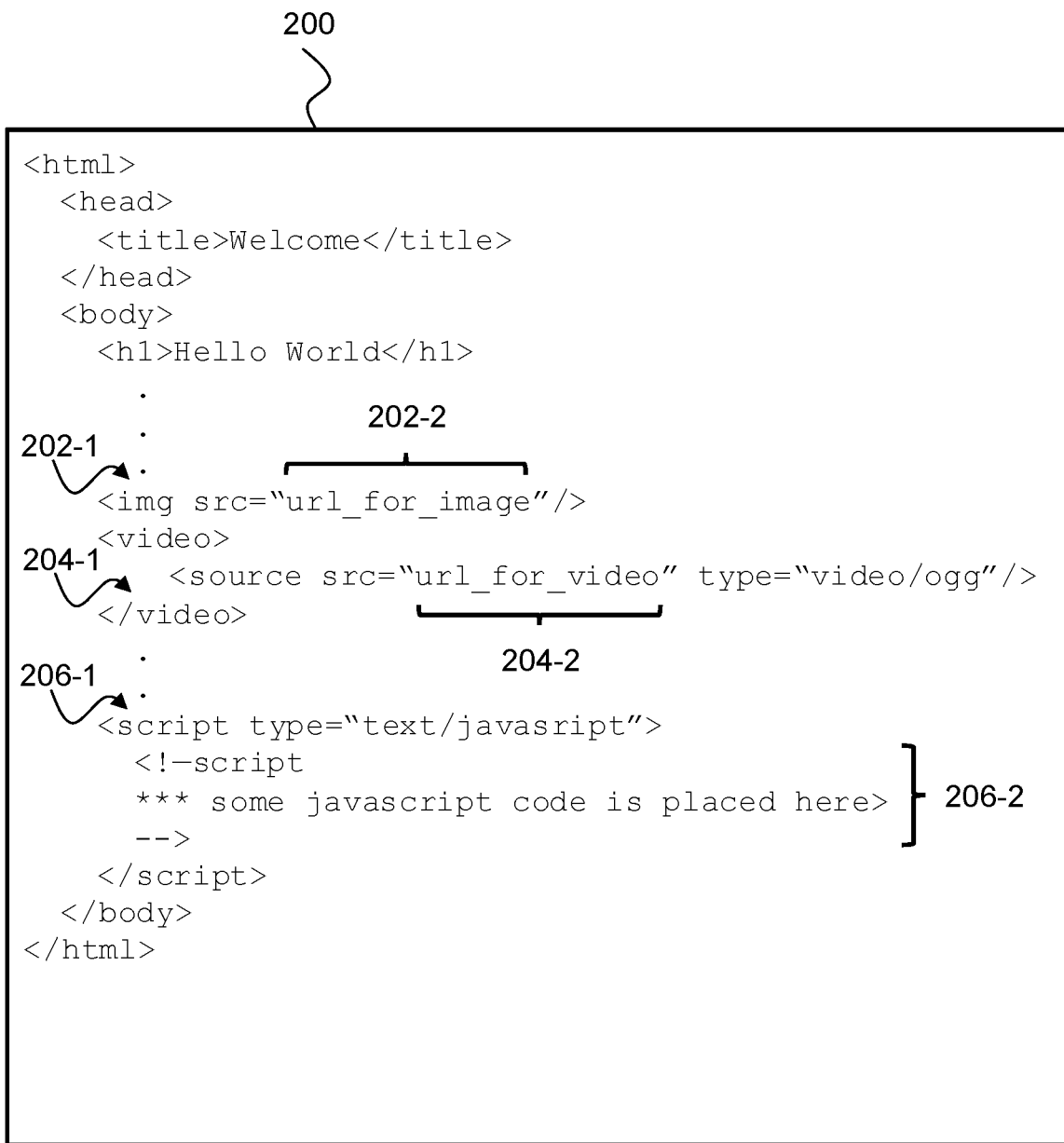
FIG. 2 shows an example of a webpage definition in the form of an HTML document.

FIG. 2 shows an example of a webpage definition in the form of an HTML document. The exemplary webpage definition 116 comprises an image element 202-1, an image resource identifier 202-2, a video element 204-1, a video resource identifier 204-2, a script element 206-1, and one or more executable instructions 206-2 associated with the script element 206-1.

Upon receipt, the web browser 112 parses the webpage definition 116 to build a data structure 118 representing the structure of the corresponding webpage in local memory associated with the web browser 112. For example, the data structure 118 may represent the webpage according to a Document Object Model (DOM).

In this respect, the DOM is a standardized model for representing the various components of a webpage and is supported by various web browsers, including Internet Explorer and Microsoft Edge, developed and maintained by Microsoft Corporation of Redmond, Wash., United States of America; Mozilla Firefox, developed and maintained by the Mozilla Foundation of Mountain View, Calif., USA; and Google Chrome, developed and maintained by Google Inc. of Mountain View, Calif., USA. The DOM is a cross-platform and language-independent convention for representing and interacting with objects in HTML documents, as well as XHTML and XML documents. The DOM represents a webpage in terms of one or more objects that are arranged according to a hierarchy of nodes which are organized according to a tree structure. The one or more objects may be addressed and manipulated using one or more methods and the public interface of a DOM is specified in its application programming interfaces (APIs). The DOM standard includes a plurality of levels. For example, DOM levels 0 and 1 are the core standards supported by the majority of web browsers, while DOM level 2 and above are extensions to DOM levels 0 and 1, which are to be optionally supported by web browsers. DOM levels 0 and 1 define a "core" set of objects and interfaces for accessing and manipulating document objects, and provide a complete model for representation of HTML documents, including the means to modify portions of the representation.

Figure 3:
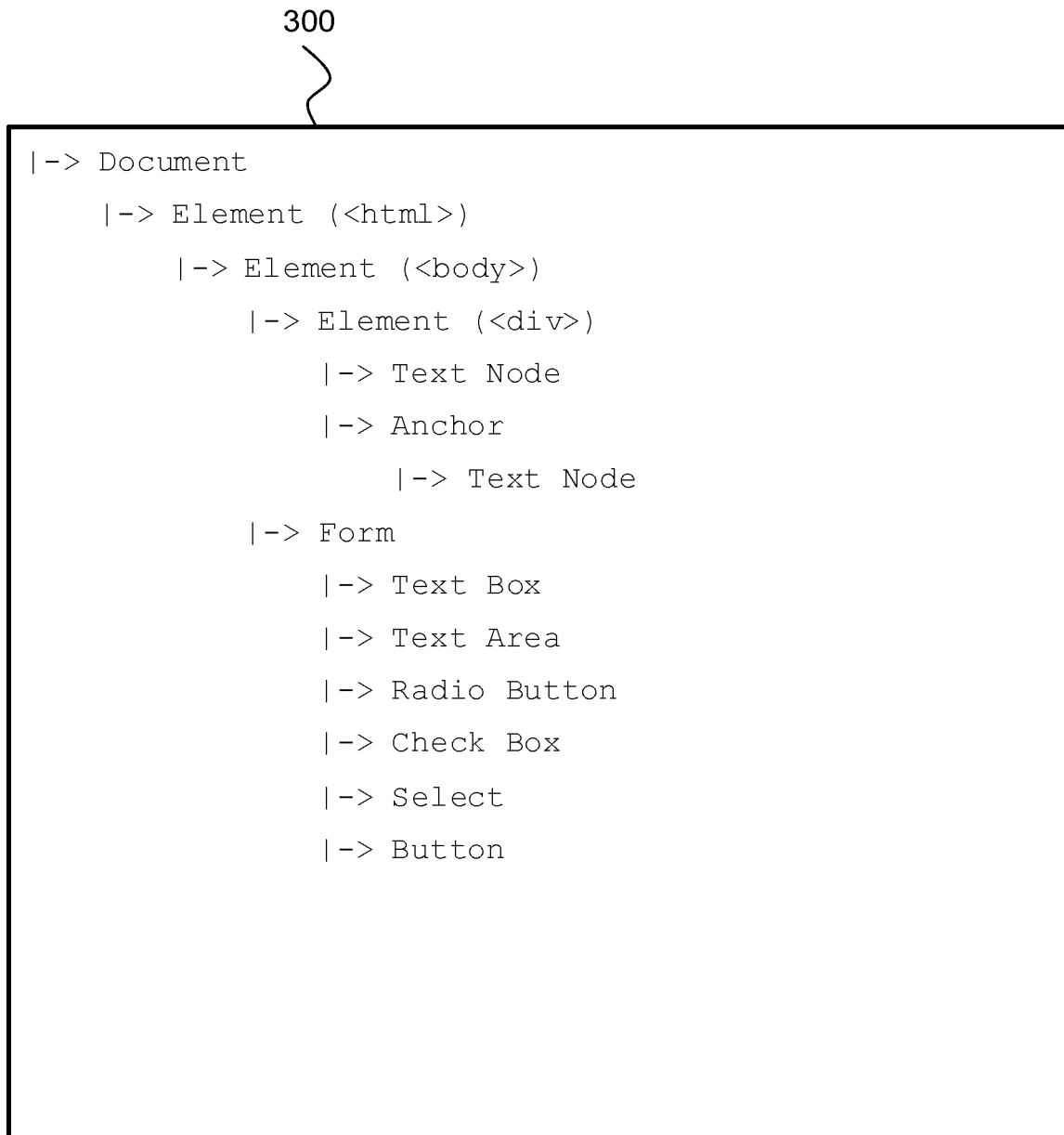
FIG. 3 is a schematic diagram showing an example of a DOM tree.

FIG. 3 is a schematic diagram showing an example of a DOM tree. As shown in FIG. 3, the topmost node, or root, of DOM tree 300 is the document object. A document object represents an entire HTML (or XML) document, and it provides the primary access to the document's data. An element within the document object, known as an element object, represents an element in the HTML document. Elements in the DOM tree 300 may include text, anchors, text-boxes, text areas, radio buttons, check boxes, selects, buttons, and the like.

With reference to the example shown in FIG. 2, when web browser 112 prepares to render webpage 200 on a screen, web browser 112 parses the received HTML webpage file and builds a DOM tree to represent the various components and resources of webpage 200 in a local memory. For example, when the image tag (shown as <img src="url_for_image"/> in FIG. 2) is parsed by web browser 112, the image is represented as an image object, and the image object is inserted into the DOM tree.

Once the webpage definition 116 has been parsed by the web browser 112, the web browser 112 builds/traverses the data structure 118 to identify any resources referenced by the data structure 118 for retrieval over the network 140. For example, where the data structure 118 takes the form of a DOM tree, the web browser 112 examines each node in the DOM to identify any resources for retrieval over the network 140. For example, a node in the DOM tree corresponding to the image tag 202-1 in the webpage definition 116 will include the associated image resource identifier 202-2, and a node in the DOM tree corresponding to the video tag 204-1 in the webpage definition 116 will include the associated video resource identifier 204-2. Accordingly, as a result of building/traversing the DOM tree, the web browser 112 will proceed to fetch the image identified by the image resource identifier 202-2 and the video identified by the video resource identifier 204-2 for rendering in the webpage. The web browser 112 therefore proceeds to issue separate network requests (e.g., HTTP GET requests) via the network 140 to fetch the image and video resources, based on the image resource identifier 202-2 and the video resource identifier 204-2 respectively. In other words, if the nodes of the DOM tree include N different resource identifiers, the web browser 112 may proceed to issue N separate resource requests (e.g., N separate HTTP GET requests) via the network 140 to request the associated resources, and in response the web browser 112 will receive N separate network responses (e.g., N separate HTTP GET responses), comprising the requested resources.

The webpage definition 116 may comprise or reference one or more dynamically executable instructions which are executed by the web browser 112 upon receipt. For example, when the webpage definition 116 takes the form of the HTML document 200 of FIG. 2, the web browser 112 may execute the one or more executable instructions 206-2 included in the script element 206-1. In some cases, the one of more executable instructions 206-2, when executed by the web browser 112, may reference or dynamically generate one or more resource identifiers associated with resources located remote from the web browser 112. In other words, the one or more executable code (e.g., JavaScript code) of a webpage definition may include or result in dynamic generation or modification of one of more resource identifiers (e.g., "dynamic resource identifiers").

The one of more executable instructions 206-2 may cause the web browser 112 to fetch a resource associated with such a dynamic resource identifier. For example, the one or more executable instructions 206-2 may cause the web browser 112 to issue a network request (e.g., an HTTP GET request) to fetch the associated resource. In this respect, the one of more executable instructions 206-2 may utilize AJAX (Asynchronous JavaScript and XML) techniques to cause the web browser 112 to issue a network request for a resource associated with the dynamic resource identifier. In particular, the one or more executable instructions 206-2 may include JavaScript code which uses the XMLHttpRequest application programming interface (API) or the jQuery library to request the resource associated with the dynamic resource identifier.

Returning to FIG. 1, as is known in the art, the web browser 112 may be configured with a third party content modification component 114.

Examples of content modification component 114 include a web browser plugin/extension, a third party program, a third party script, and any other third party program/code that is able to alter content of web browser 112. In an alternative embodiment, content modification component 114 is a standalone program/process separate from web browser 112. The content modification component 114 may be configured to take actions with respect to a particular resource associated with the webpage rendered by the web browser 112. For example, the content modification component 114 may be configured to prevent the web browser 112 from issuing a resource request associated with the particular resource, or to cause the web browser 112 to fetch a different or alternative resource in place of the particular resource.

Blocking mechanisms of content modification component 114 may be at least partly circumvented by transforming (e.g., encoding) resource identifiers/locators in the webpage definition 116 prior to delivery to the web browser 112. For example, the content provider system 130, or intermediary, in the network 140, may be configured to transform the one or more URIs/URLs in an HTML document to reduce the likelihood that the content modification component 114 will be able to identify the associated resources. In this manner, it is possible to reduce the likelihood that resources associated with the HTML document are blocked or modified by the content modification component 114 prior to rendering of the associated webpage. However, such countermeasures are only available with respect to static resource identifiers which are already present as static elements in web content (e.g., webpage definition 116) prior to receipt by the web browser (e.g., resource identifiers utilized in HTML elements that are not scripts) and are not applicable to dynamic resource identifiers which are utilized in dynamically executed code (e.g., utilized in JavaScript present or referenced in the webpage definition 116). For example, because resource identifiers specified in dynamically executed code may be dynamically modified, extracted or utilized as a basis to build other identifiers, transformation of a resource identifier to an encoded form prior to execution of the dynamically executed code may result in execution errors. In another example, a dynamic resource identifier is dynamically generated during dynamic code execution and is not present in its complete form in the text of web content received at a web browser.

In some embodiments, dynamic resource identifiers are specified or generated by dynamically executable script/code or application (e.g., code of JavaScript, other managed or interpreted programming language, etc.) while static resource identifiers are not specified by dynamically executable script/code or application (e.g., specified within non script HTML elements). Accordingly, in order to maintain the integrity of the webpage, alternative or additional countermeasures are required to prevent modification/blocking of resources associated with dynamic resource identifiers by the content modification component 114. Accordingly, certain embodiments described herein provide various techniques to prevent modification/blocking of resources by the content modification component 114.

Figure 4:
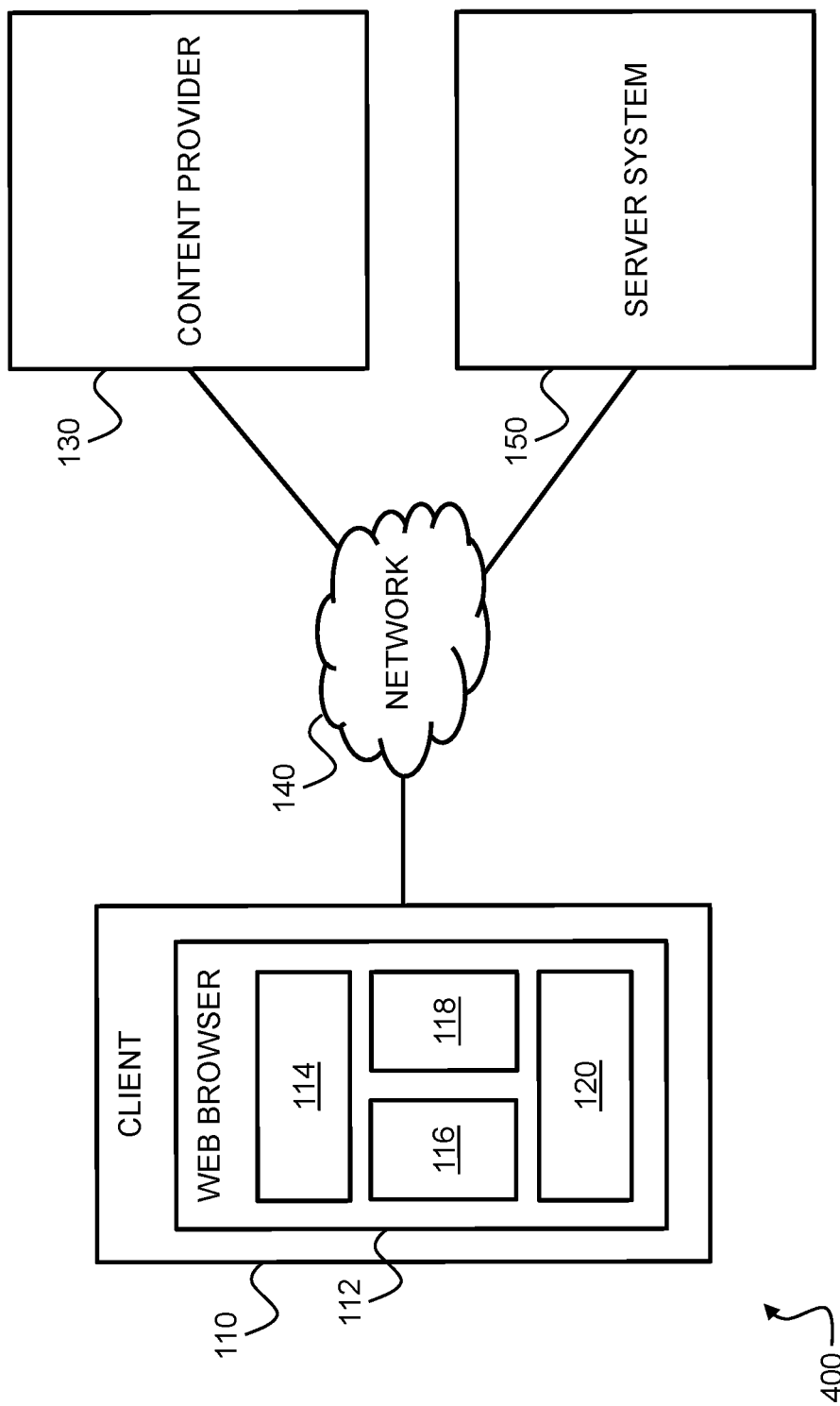
FIG. 4 is a schematic diagram showing an example of a system for controlling rendering of content in a web browser in accordance with an embodiment

FIG. 4 is a schematic diagram showing an example of a system for controlling rendering of content in a web browser in accordance with an embodiment. The system 400 of FIG. 4 comprises a number of components which are common with the system 100 of FIG. 1 and have been denoted using the same reference numerals. The system 400 of FIG. 4 additionally comprises a server system 150 which acts as a proxy between the client device 110 and the content provider 130 and facilitates one of more countermeasures to protect the integrity of web content delivered from the content provider 130 to the client device 110 over the network 140. That is, the server system 150 is configured to act as an intermediary for requests for webpages originating from the web browser 112 configured on the client device 110. In this respect, the server system 150 may operate transparently (e.g., without requiring any manual configuration by an end user and/or a content origin). In some examples, the server system 150 may comprise a proxy server, a gateway server, an edge server, or any other apparatus suitable for implementing the following techniques.

As described above, in some embodiments, the server system 150 may implement one or more server-side countermeasures to protect the integrity of web content delivered to the web browser 112. For example, the server system 150 may be configured to transform one or more static resource identifiers in a webpage definition 116 to be delivered to the client device 110 to prevent the content modification component 114 and/or network-side content blockers from identifying and blocking requests or rendering of the associated resources. In other words, the server system 150 is configured to transform and encode the one or more static resource identifiers to obfuscate the identity of the associated resources. Once the one or more static resource identifiers have been modified, the server system 150 proceeds to deliver a modified version of the webpage definition 116 comprising the transformed static resource identifiers to the web browser 112 for rendering. In some embodiments, the static resource identifiers have been transformed in a manner that preserves a least a portion of special characters included in the original static resource identifiers in resulting encoded forms of the static resource identifiers. In other words, the server system 150 is configured to transform and encode the one or more dynamic resource identifiers specified in a web content prior to delivery to web browser 112 to obfuscate the identity of the associated resources. For example, certain resource identifiers included in the text of a script have been identified as okay to transform/encode prior to script execution.

As also discussed above, dynamic resource identifiers may be included and/or generated by one or more executable code included or referenced by the webpage definition 116 which are executed by the web browser 112. Accordingly, at least a portion of the dynamic resource identifiers are not available for transformation or are not allowed to be modified (e.g., to ensure correct execution of the dynamically executable code) by the server system 150. Accordingly, the server system 150 may facilitate one of more client-side countermeasures by provisioning the web browser 112 with a component 120 (e.g., virtualization client) that is executable within the web browser 112 to transform one or more dynamic resource identifiers originating from the one or more dynamically executable code specified in or referenced by the webpage definition 116. For example, the component 120 may take the form of one or more scripts that are "injected" into the webpage definition file 116 by the server system 150. In some examples, the component 120 may take the form of one of more scripts written using the JavaScript language. Alternatively, the component 120 may take the form of a code/script that is "pre-delivered" to the web browser prior to delivery of the webpage definition 116 by the server system 150.

In relation to transformations that may have been applied by the server system 150 to static resource identifiers, component 120 is configured to process such transformed static resource identifiers in order to reverse the transformation and recover the original resource identifier. For example, when a resource identifier that identifies a location address pointing to the content provider 130 is transformed/encoded, the resulting encoded resource identifier identifies a location address pointing to server system 150 that will serve as a proxy between the client device 110 and the content provider 130 by fetching the resource of the resource identifier from content provider 130 and delivering it to client device 110. When server system 150 receives a resource request made using an encoded resource identifier, server system 150 decodes the encoded resource identifier back to its original resource identifier and utilizes this original resource identifier to fetch the desired resource and respond to resource request.

According to some embodiments, the component 120 may be configured to control manipulation of the data structure 118 representing the structure of the webpage defined by webpage definition 116. For example, the component 120 may be configured to control access to a DOM tree by intercepting requests to the DOM interface. In effect, the component 120 serves as a virtualization layer to control access to the DOM interface. This virtualization may be facilitated by one or more wrapper methods/functions with respect to one or more of the APIs of the DOM (e.g., Document API interface of a webpage) that replace and wrap corresponding standard API methods/functions of the DOM (e.g., method API calls to create, delete or update elements in the DOM via a Document API interface are replaced with corresponding wrapper methods). For example, particular memory address locations identifying standard code of DOM API (e.g., Document API) methods/calls are replaced with memory address locations of replacement wrapper methods/functions provided via component 120. In some embodiments, DOM core level 1 APIs for manipulating the DOM tree are supplanted by the equivalent interfaces provided via component 120. In this manner, the component 120 is able to intercept requests for resources and modify the requests (e.g., transform/encode resource location identifier (e.g., URL) of a request) in a manner that is transparent to other processes running within the web browser 112 environment. In other words, the component 120 ensures that any other processes running within the web browser only have access to the encoded resource identifiers and thus are unable to determine the original identity (e.g., original location identifier) of resources associated with the webpage. This virtualization of the DOM interface can be used by the component 120 to implement one or more client side optimizations of the webpage and, in particular, one or more client-side countermeasures to protect integrity of the webpage.

According to some embodiments, one optimization enabled by virtualization of the DOM involves encoding of resource identifiers, whereby to cause the web browser 112 to request a resource from a content server other than that from which the resource would be requested without the encoding. For example, rather than request resources from an origin server, resources are requested from a proxy server (e.g., server system 150). Another optimization enabled by virtualization of the DOM is masking or obfuscation of dynamic resource identifiers. In this manner, the component 120 is able to prevent the content modification component 114 from identifying and blocking or modifying network requests issued by the web browser 112 by masking/obfuscating resource location identifiers of the network requests. For example, the component 120 may utilize one or more API method/function wrappers to intercept a request to add or modify an object stored in the DOM tree, and transform any resource identifiers included in the request to prevent identification of the original location identifier by the content modification component 114.

In some examples, the request to add or modify an object in the DOM tree may originate from one or more executable code in or referenced by the webpage definition 116, which are executed by the web browser 112 and intercepted to invoke the component 120. In this manner, the component 120 is able to transform dynamically generated and utilized resource identifiers before they are added to the DOM tree, thereby circumventing the content modification component 114. In some examples, the one of more executable code which invoke and implement the component 120 may be inserted into the webpage definition 116 by the server system 150 prior to delivering the webpage definition 116 to the client device 110.

As discussed above, the content modification component 114 may monitor and block resource requests before they are issued by the web browser 112. In some embodiments, the component 120 is configured to control access to the DOM interface to "intercept" resource requests originating from the one or more code instructions such that network requests for resources are not blocked by the content modification component 114. To achieve this, the component 120 may implement one or more wrapper methods/functions with respect to one or more APIs that cause the web browser 112 to issue network requests. For example, the component 120 may implement one or more wrapper methods for the .setAttribute API method to intercept setting of an attribute of a DOM element that identifies a resource identifier and obfuscate the resource identifier before it is added to the DOM and utilized to initiate a network request that can be potentially monitored and blocked by the content modification component 114 based on the resource identifier. In some examples the requests to the API call may originate from a script (e.g., script 206-2) included in the webpage definition 116 and/or a script resource referenced by the webpage definition 116, which, when executed, includes one or more dynamic resource identifiers. Accordingly, in these embodiments, the component 120 is able to obfuscate the dynamic resource identifiers before the original resource identifier is potentially identified and blocked by the content modification component 114.

According to some embodiments, the virtualization component 120 may be configured to apply a transformation to resources associated with a webpage, in addition to applying a transformation/encoding to resource identifiers associated with the webpage. For example, the virtualization component may apply a transformation to a resource in order to mask the content of that resource from content modification functionality associated with the web browser 112. Similarly, in some examples, the virtualization component 120 may be configured to transform the content of a resource in response to transforming the content of a resource identifier associated with a different resource. For example, the virtualization component 120 may be configured to apply a transform to content displayed within an HTML iFrame element, in response to a transform being applied to a resource identifier for the iFrame element itself.

According to some embodiments, the web browser 112 may store one or more resources associated with the webpage in a local cache associated with the web browser. For example, the web browser 112 may cache a resource in response to an earlier network request in respect of that resource using a transformed resource identifier. In this example, the web browser 112 may retrieve the cached resource from the cache based on the transformed resource identifier, rather than issuing a network request for the resource to the server system 150 using the transformed resource identifier.

In some embodiments, when web browser 112 requested a webpage, the web browser was provided a modified webpage file of the original webpage. For example, rather than providing the originally requested HTML file of the original requested webpage, the web browser is provided an alternative webpage file of the original webpage that includes component 120. In some embodiments, although certain resource identifiers of the webpage may have been already transformed/encoded prior to delivery to web browser 112, certain resource identifiers may not have been transformed/encoded from their original identifier. For example, dynamically referenced resource identifiers of scripts may not have been transformed prior to delivery. In some embodiments, when an external resource of the webpage is requested via dynamically executed code, component 120 transforms an identifier of the resource to obfuscate the identity of the external resource to prevent content modification component 114 from detecting the identity of the external resource.

In some embodiments, rather than providing the full HTML webpage file of an original requested webpage, the web browser 112 is provided an alternative webpage file of the original webpage that includes component 120 but not the complete contents of the requested webpage (e.g., HTML file) that would have been provided in a traditional response. When web browser 112 attempts to render the alternative webpage file, component 120 is executed. Then component 120 may request and receive contents of the original requested webpage. Because this allows component 120 access the contents of the original requested webpage prior to including it in the DOM for rendering by a web browser, component 120 is able to modify the contents of the original requested webpage, including resource identifier, prior to rendering and detection by content modification component 114.

In some embodiments, rather than requesting a resource of a webpage to be rendered directly from its original content source identified by an original webpage, the request is proxied and/or rerouted via an intermediary such as server system 150. For example, if translated/encrypted resource identifiers are utilized by web browser 112 to make a request for a resource to the original content source (e.g., content provider 130), the request may fail because the original content source does not recognize the transformed/encrypted resource identifier. By routing the request via server system 150, server system 150 translates the transformed resource identifier back to its original identifier and requests as the proxy the requested resource from the content source (e.g., send request to provider 130) using the original identifier. Once server system 150 receives the resource, the resource is provided to the client in response to the request for the resource provided using the transformed resource identifier.

In some embodiments, component 120 may be injected into a webpage based on standards-based (e.g., HTML, JavaScript, ActionScript, etc.) procedures. For example, after server system 150 receives a request from web browser 112 requesting an HTML webpage file, server system 150 injects code implementing component 120 into an alternative HTML webpage file of the requested HTML file, and then sends the response back to web browser 112. In some embodiments, component 120 may be injected into a webpage by a content provider directly. For example, web browser 112 requests an HTML webpage file directly from content provider 130 and content provider 130 provides an alternative webpage file with code of injected component 120. Content provider 130 may be a content producer of the provided content. In some embodiments, component 120 may be injected by adding JavaScript client code in the head section of an alternative HTML webpage file.

Figure 5:
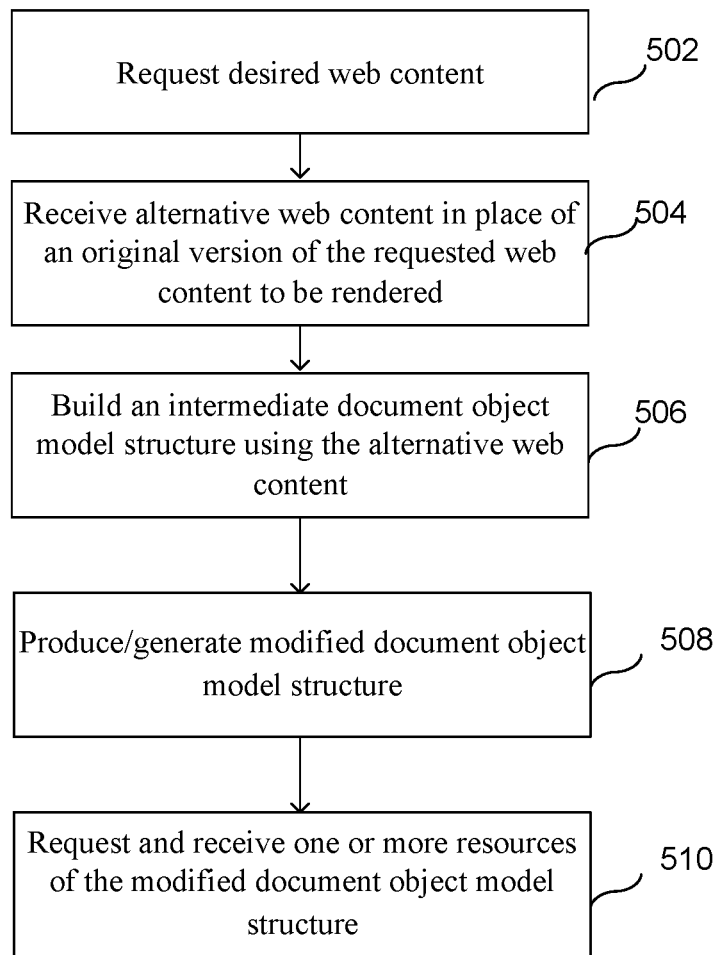
FIG. 5 is a flowchart illustrating an embodiment of a process for generating a modified document object model.

FIG. 5 is a flowchart illustrating an embodiment of a process for generating a modified document object model. The process of FIG. 5 may implemented on one or more components of client 110 of FIG. 4.

At 502, desired web content (e.g., webpage definition 116) is requested. For example, the web browser 112 sends an HTTP request message to a server (e.g., server system 150 or content provider system 130). Examples of the web content include a webpage, streaming content, a web application, a web resource, a dynamically executable code resource, a script, a resource of a webpage, and any other content accessible via the Internet. In some embodiments, the request includes an identifier of the requested content that is resolved to another identifier. For example, the request includes a URL (e.g., received from a user that types the URL or selects a link of the URL) and at least a portion of the URL is provided to a DNS server to translate at least a portion of the URL to an IP address to be utilized to request the web content. In some embodiments, the destination of the request is adjusted dynamically using the DNS server. For example, a mapping between a domain of a URL of the request and an associated IP address may be modified to modify a destination of the request (e.g., such that the request is routed to the server system 150). In some embodiments, the requested web content is requested by an Adobe Flash application. In some embodiments, the requested web content is requested by a mobile application such as an Apple iOS application or a Google Android application.

At 504, alternative web content is received in place of an original version of the requested web content to be rendered. For example, the alternative web content is placeholder content that includes code implementing a virtualization client (e.g., component 120 of FIG. 4). By providing the virtualization client to the client device, the virtualization client can request, intercept, and process, at least a portion of the file of the original requested web content as well as its resources. This contrasts to the behavior with respect to a traditional web content request response, in which the original requested web content to be rendered would be obtained from an origin server. By providing the alternative web content comprising the virtualization client, a virtualization layer may be enabled between a web browser and the original requested web content to enable optimizations, or more generally, modifications with respect to the original requested web content.

In some embodiments, the received alternative web content includes a virtualization client such as virtualization client 120. For example, code implementing virtualization client 120 of FIG. 4 is inserted into a webpage definition file (e.g., HTML file) that is received as the received alternative web content. In some embodiments, this alternative web content is a placeholder webpage file that does not include contents of the original requested web content. In some embodiments, the alternative web content includes a portion of the original requested web content but not the entire contents of the original requested web content. At least a portion of the original requested web content not included in the received alternative web content may be dynamically requested and processed by the virtualization client for inclusion in a DOM for rendering. This allows the virtualization client an opportunity to transform and process even static resource identifiers of the original requested webpage file because the virtualization client has access to the original requested web content before it is provided to the web browser for rendering by including it in the DOM. In other words, static resource identifiers are effectively converted to dynamic resource identifiers that can be intercepted by allowing the virtualization client to access the original requested web content prior to providing it the web browser for rendering (e.g., prior to inclusion in the DOM).

The virtualization client may be coded in a managed programming language (e.g., runs in a Common Language Runtime) and/or a web programming/scripting language such as JavaScript, Java, .Net, etc. In some embodiments, the virtualization client may be injected by adding JavaScript client code in the head section of an HTML webpage file included in the alternative web content. In some embodiments, the received alternative web content is received from server system 150 of FIG. 4. In some embodiments, the received alternative web content is received directly from content provider 130 of FIG. 4.

In some embodiments, alternative web content includes an identification of the original requested web content to be rendered. For example, a location address where the original requested web content (e.g., URI where the actual original requested web content is located) is to be obtained is specified in the alternative web content. In this example, rather than allowing a user to directly visit a location where the original requested web content can be obtained, the user is directed to a location of the alternative web content when the user attempts to obtain the original requested web content. In some embodiments, the received alternative web content includes one or more resource identifiers that have been transformed using at least a portion of the process of FIG. 6.

At 506, an intermediate document object model (DOM) structure is built using the alternative web content. In some embodiments, building the intermediate document object model structure includes allowing a web browser (e.g., web browser 112 of FIG. 4) to receive and process the alternative web content received at 504. For example, the web browser builds a document object model tree of an alternative web content received at 504. Building the intermediate document object model structure may include executing program code implementing a virtualization client (e.g., virtualization client 120 of FIG. 4) included in the received alternative web content. In some embodiments, building the intermediate document object model structure includes inserting objects in the intermediate document object model structure of content included in the alternative web content. For example, the alternative web content includes a portion of original requested web content to be rendered, and objects corresponding to the included original requested web content portions are inserted in the intermediate document object model structure.

At 508, a modified document object model structure is generated by modifying the intermediate document object model. For example, the virtualization client included in the alternative web content modifies the intermediate document object model structure with data of the original requested web content to create a modified document object model structure. In some embodiments, generating the modified document object model structure includes requesting and receiving the original requested web content. For example, a virtualization client included in the received alternative content that was received in place of the original requested web content, requests and receives the original requested web content to be rendered using an alternate location address where the original requested web content can be obtained. This gives the virtualization client an opportunity to transform and process even static resource identifiers of the original requested webpage file because the virtualization client has access to the original requested web content before it is provided to the web browser for rendering. In some embodiments, a portion of the original requested web content was included in the received alternative content and a remaining portion of the original requested web content is requested by the virtualization client. In some embodiments, generating the modified document object model structure includes modifying the requested and received original requested web content. For example, location addresses of resources specified in the original requested web content are modified (e.g., using a transformation/encoding similar to the transformation/encoding performed in 608 of FIG. 6). In another example, the original requested web content is modified for more optimized content delivery and/or rendering. In some embodiments, generating the modified document object model structure includes placing objects of the original requested web content received by the virtualization client in the intermediate document object model structure. For example, the virtualization client modifies the intermediate document object model structure to include objects of the original requested web content received by the virtualization client to render the original requested web content.

In some embodiments, the virtualization client manipulates the DOM including the creation, deletion, or update of nodes within the DOM tree to implement optimizations. In various embodiments, by producing the modified document object model structure different from an original document object model structure corresponding to the original version of the desired web content, various types of different types of optimizations may be achieved. In some embodiments, content redirection can be achieved by replacing a location address of a webpage resource with another location address that is able to provide the resource faster. In some embodiments, optimized delivery of information over a network by segmentation and reprioritization of downloaded information can be achieved. For example, the delivery of the information (e.g., the order in which the information is delivered or the granularity of the information delivered) and the actual content of the delivered information corresponding to any nodes of the DOM tree may be altered, thereby speeding up the rendering of a webpage without compromising the end-user's experience.

In various embodiments, generating the modified document object model structure includes modifying the document object model structure (e.g., selecting a modification to be performed) based on a property of a client system (e.g., detected property) that is to render the original requested web content. For example, the optimizations of the original requested web content performed by the virtualization client take into consideration a property of the client system. For the same original requested web content, this may allow one type of optimization to be performed for one type of user system while allowing a different optimization to be performed for another type of user system. Examples of the property of the client system include the following: a type of web browser, a web browser version, available plugin/extensions of a web browser, a java processing software version, a type of operation system, a type of network connection, a network connection speed, a display property, a display type, a display window property, a type of user device, resources of a user system, or a system property of a user system.

In some embodiments, mapping data that is to be utilized by the virtualization client to modify the intermediate document object model structure is received. The virtualization client may utilize the mapping data to transform/encode resource identifiers included in the received original requested web content. For example, the mapping data is utilized by the virtualization client to replace at least a portion of a content location address of a webpage resource (e.g., resource identifier) to another address specified by the mapping data. The mapping data may include a data structure (e.g., a table, a database, a chart, a hash table, a list, a spreadsheet, etc.). In some embodiments, the received mapping data is encoded in HTML (e.g., encoded using HTML tags). In some embodiments, the received mapping data is encoded in JavaScript Object Notation. In some embodiments, by utilizing the mapping data, one or more portions of content location addresses of the original requested web content are dynamically modified.

The received mapping data may include one or more entries mapping at least a portion of an initial location address/domain to a different identifier. For example, a mapping data entry maps an initial URI/URL portion to an encoded URI/URL portion. In another example, a mapping data entry maps an initial URI/URL to a location address that includes an IP address. In another example, a mapping data entry maps a domain name and/or subdomain (e.g., associated with content provider system 130 of FIG. 4) of an original resource identifier to a different domain name and/or subdomain (e.g., associated with a proxy such as server system 150 of FIG. 4) to be utilized in the transformed/encoded identifier. There may exist a plurality of different intermediary servers and each different intermediary server may be assigned to handle content for certain assigned domains (e.g., each intermediary server may cache content for different domains). In this example, entries in the received mapping data identifies the domain name and/or subdomain of the corresponding intermediary server (e.g., server system 150 of FIG. 4) that will proxy and handle the translation of the associated encoded identifier back to the original identifier. The received mapping data may be utilized to transform both static resource identifier of the received original requested web content of the virtualization client and dynamic resource identifiers intercepted during execution of dynamically executable code (e.g., location address generated by execution of a web application).

In some embodiments, at least a portion of a resource identifier to be transformed/encoded is used to search a data structure that includes the received mapping data. If an entry that matches the at least portion of the resource identifier is found, the original resource identifier is modified using the matching entry. For example, the entry maps a domain name of an URL included in the resource identifier to a different domain name and/or subdomain to be utilized in the resulting encoded resource identifier. If a matching entry is not found in the data structure, the initial location address without replacement or translation may be utilized. In some embodiments, if a matching entry is not found in the data structure, the original resource identifier is modified using a standard default replacement identifier portion. For example, a default encoding policy specifies at least a portion of a domain name to be utilized in the corresponding encoded version of the resource identifier.

In some embodiments, the mapping data is received together with the alternative web content as a single received content (e.g., specified in the alternative web content). In some embodiments, the alternative web content and the mapping data are received from the same server. In some embodiments, the mapping data is received together with the original requested web content. In some embodiments, the mapping data is received separately from the alternative web content and the original requested web content. For example, a virtualization client included in the web content requests/receives the mapping data in a separate request.

In an alternative embodiment, step 508 is not performed and the modified document object model does not need to be generated. For example, the received alternative web content includes the entire contents of the original requested web content (e.g., with static resource identifiers that have been already transformed/encoded) with an inserted code to implement the virtualization client.

At 510, one or more resources of the modified document object model structure are requested and received. For example, a web browser traverses the modified DOM tree to retrieve any dependent resources (e.g., images, scripts, video, etc. to be obtained via a network to render a webpage) indicated by any of the nodes in the DOM tree via a network. The received resources may be utilized to populate the modified DOM and/or provide/render content to a user. In some embodiments, the requests for the one or more resources are requested using corresponding network location addresses that have been modified/translated when modifying the intermediate DOM in 508. In some embodiments, requesting one or more resources includes intercepting a request for a resource. For example, a virtualization client such as virtualization client 120 intercepts requests for one or more resources of the web content before the request is made via the network. In some embodiments, once the location address of a resource has been analyzed and replaced with an encoded location, if appropriate, the resource is requested via the network. Requesting the resource via the network may include further translating at least a portion of the translated location address using a name server (e.g., DNS server) to translate a domain name of the location address to an IP address.

Interception may be implemented by means of method/function wrapping, whereby the virtualization client effectively traps API calls to the DOM interface, and/or modifies the otherwise standard behaviour of the web browser. In some embodiments, a location address included in an intercepted request is replaced with an encoded location address. By using the encoded location address, an initially referenced content may be replaced with a different/modified content and/or requested using a different server.

A location address of the intercepted request may be replaced with an encoded location address determined using the received mapping data. By using the encoded location address, an initially referenced content may be replaced with a different/modified content and/or requested using a different server. In some embodiments, an inline code inserted in the received web content is utilized to intercept the request and/or replace the location address of the intercepted request with a translated location. For example, rather than utilizing a virtualization client configured to intercept all requests, a more localized inline JavaScript code (e.g., associated with one or more particular requests and/or particular utilizations of one or more particular location addresses) is added and/or utilized to replace original JavaScript code to handle the interception and/or resource identifier translation. In some embodiments, a programming language/script content/file (e.g., implementing virtualization client component 120 of FIG. 4) inserted/referenced in the received alternative web content is utilized to intercept a request and/or replace an original resource identifier in the intercepted request with an encoded resource identifier.

In some embodiments, in response to a network resource request, an updated mapping data is received in addition to the requested resource content. For example, data updating the previously received mapping data is received along with the requested resource content if the mapping data is to be updated. In some embodiments, the updated mapping data includes new mapping data entries to replace the entire previously received mapping data. For example, virtualization client 120 replaces a stored version of the previously received mapping data with the updated mapping data. In some embodiments, the updated mapping data includes only the data entries required to partially update the previously received mapping data. For example, virtualization client 120 utilizes the received update to modify a portion of the previously received mapping data.

The updated mapping data may be received from the same server as the server that provided a requested resource. In some embodiments, the updated mapping data is provided by a different server from the server that provided the requested resource content. The requested resource and the updated mapping data may be received together as a signal data package or may be received separately. In some embodiments, the updated mapping data is received as needed without necessarily being received in response to a resource request. For example, a virtualization client such as client 120 of FIG. 4 periodically polls a server (e.g., server system 150 of FIG. 4) for any update to the mapping data. In another example, updates to the mapping data are dynamically provided/pushed to the virtualization client as needed.

Figure 6:
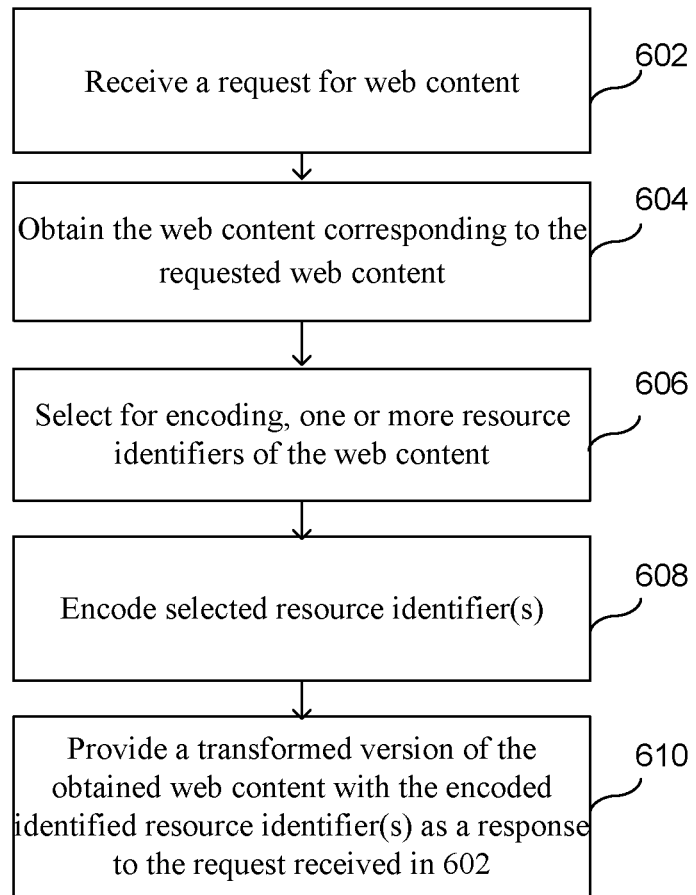
FIG. 6 is a flowchart illustrating an embodiment of a process for providing a transformed version of a web content.

FIG. 6 is a flowchart illustrating an embodiment of a process for providing a transformed version of a web content. The process of FIG. 6 may be implemented on server system 150 and/or content provider 130 of FIG. 4. In some embodiments, the process of FIG. 6 is utilized to generate at least a portion of the alternative web content received in 504 of FIG. 5.

At 602, a request for web content is received. For example, a request for a webpage (e.g., webpage definition 116) is received. In some embodiments, the request is the request provided in 502 of FIG. 5. In some embodiments, the request is a request for at least a portion of the original requested content made by the virtualization client in 508 of FIG. 5 to generate the modified document object model structure. In some embodiments, the request is an intercepted request. For example, a web browser has requested a webpage using a URL that would traditionally map to content provided by an origin server (e.g., originally to be provided by content provider 130 of FIG. 4) and the request has been rerouted/forwarded to a different intermediary server (e.g., server system 150 of FIG. 4). In one example, a client requested a webpage using a URL and a DNS mapping between a domain of the URL of the request and an associated IP address has been dynamically modified to redirect/modify a destination server of the request. Examples of the web content include a webpage, a web application, content of a mobile application, other networked content, etc.

At 604, the web content corresponding to the requested web content is obtained. For example, web content that would be traditionally provided from an origin content provider to a client has been requested and received at an intermediary server (e.g., server system 150 of FIG. 4). This intermediary server is acting as the proxy that will provide a modified version of the requested web content with obfuscated resource identifiers. In some embodiments, the web content is requested and obtained from a content provider (e.g., origin server) using a location address provided in request of 602. In some embodiments, in the event the requested web content has been cached, a cached version is identified and obtained from the cache using an identifier provided in the request of 602. In some embodiments, in the event the request has been directly received at an origin content provider (e.g., content provider 130 of FIG. 4), the requested content is identified and obtained from storage of the origin content provider.

At 606, one or more resource identifiers (e.g., identifier of dependent resources) of the web content to transform/encode are selected. In some embodiments, identifier(s) of resource(s) known or vulnerable to be targeted by an unauthorized content modifier (e.g., content modification component 114 of FIG. 4) are selectively selected for transformation to prevent the unauthorized content modifier from recognizing the resource. For example, resources of one or more specified types (e.g., specific file type, script, advertisement, etc.) are selected for identifier transformation. In another example, resources that are to be obtained from one or more specified Internet domains (e.g., a domain name included in a resource identifier of the resource matches an entry in a data structure) or servers are selected for identifier encoding. In some embodiments, one or more identifiers of resource(s) known to be not targeted by unauthorized content modifiers are also selected for transformation. For example, once content modifying entities discover that targeted resource identifiers are being obfuscated, an unauthorized content modifier may be configured to recognize a pattern of the transformations/encoding and block all resources that are identified by encoded/obfuscated identifiers. By also encoding identifiers of resources that the unauthorized content modifier does not desire to modify/block, the unauthorized content modifier is unable to simply block/modify all requests for resources with encoded/obfuscated identifiers and is also unable to take a whitelist approach of only allowing requests for resources with known/recognized identifiers. In some embodiments, all resource identifiers included in the web content are transformed. Examples of the resources linked using resource identifiers include a file, an image, a script, a JavaScript, a script element, a web program, a style sheet language object (e.g., CSS file), and other content elements to be obtained to render the web content. Examples of the resource identifier include a Uniform Resource Identifier (URI), a Uniform Resource Locator (URL), a network path, a location address, a storage location and any other content identifier.

In some embodiments, the selected resource identifiers are static resource identifiers of the received web content. For example, static resource identifiers include identifiers specified within static non-script HTML tags in an HTML webpage file (e.g., the <img src="url for image"/> tag as shown in FIG. 2). Because a static HTML GET request is not made via a JavaScript call, the static requests are eligible for interception by a virtualization client to transform/encode during execution, and instead the static resource identifiers are selected for encoding prior to delivering the web content that references the static resource identifiers. In some embodiments, the selected resource identifiers include resource identifiers specified within a dynamically executable script/code (e.g., JavaScript). For example, the resource identifiers specified within the dynamically executable script/code and allowed to be encoded prior to execution are selected to be encoded prior to delivering the web content that references the resource identifiers within the dynamically executable script/code.

At 608, selected resource identifier(s) are encoded. For example, encoding a resource identifier includes modifying at least a portion of character contents of the selected resource identifier. The resource identifier may include a URI and at least a portion of the URI is encoded to obfuscate the URI. In some embodiments, encoding a resource identifier includes encrypting at least a portion of the resource identifier. For example, the resource identifier is encrypted using a public key of a public key cryptography that can be only decrypted using a private key corresponding to the public key. In some embodiments, the key utilized to encrypt the resource identifier is specific to a content provider of the resource identified by the resource identifier, a recipient (e.g., client) of the resource, an intermediary server performing the encryption, a resource type of the resource, and/or a network/domains/URI of the resource identifier. In some embodiments, the key utilized to encrypt the resource identifier is common across various different content providers, recipients (e.g., clients), intermediary servers performing the encryption, resource types, and/or network/domains/URIs. In some embodiments, the key utilized to encrypt the resource identifier is automatically changed over time. For example, in order to prevent an unauthorized content modifier from learning a pattern of the encryption, the encryption key is changed periodically. In some embodiments, encoding the resource identifier includes hashing at least a portion of the resource identifier. For example, a hash value is determined as the transformed identifier using a hashing function and the original resource identifier is stored in a corresponding hash table. In some embodiments, the original resource identifier is stored in a table, a database, or other data structure to be utilized to determine the original resource identifier from the transformed identifier. In some embodiments, the encoding the selected resource identifier includes encoding the selected resource identifier in a manner that preserves one or more special characters included in the original selected resource identifier in the encode version of the original selected resource identifier in a manner as further described in this document.

At 610, a transformed version of the obtained web content with the encoded resource identifier(s) is provided as a response to the request received in 602. In some embodiments, the transformed version of the web content has been generated by replacing the selected resource identifiers with the corresponding encoded resource identifiers. In some embodiments, the provided web content is received at 504 (e.g., as the alternative web content) or 508 (e.g., utilized to generate modified document object model) of FIG. 5. In some embodiments, the transformed version includes a virtualization client (e.g., virtualization client 120 of FIG. 4). For example, the virtualization client has been configured to intercept and operate on the dynamic resource identifiers to transform the dynamic resource identifiers to encoded resource identifiers.

Figure 7:
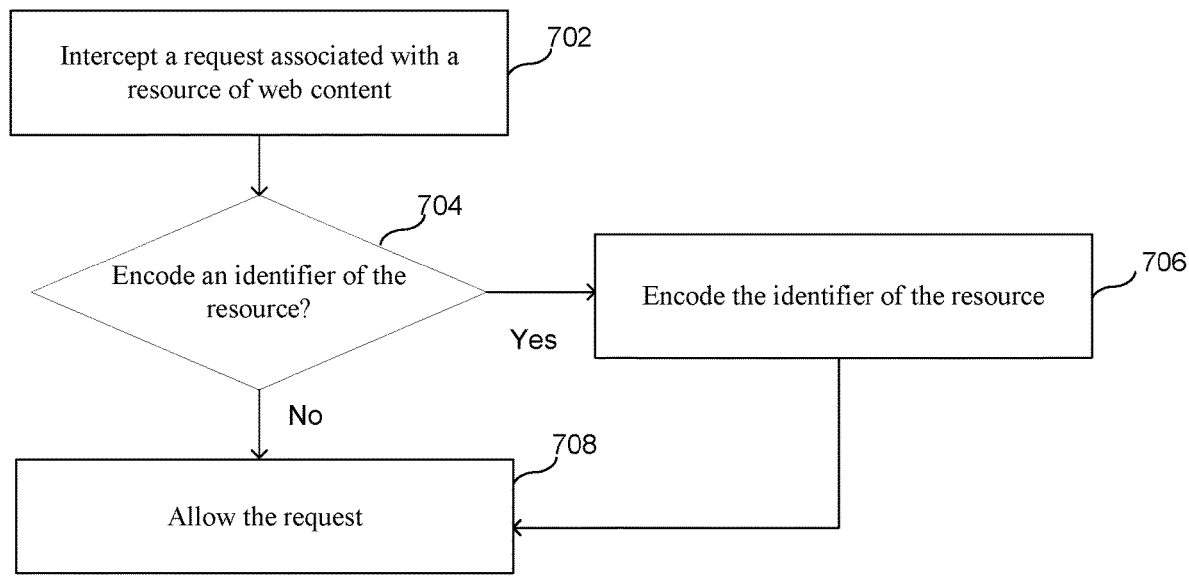
FIG. 7 is a flowchart illustrating an embodiment of a process for dynamically encoding a resource identifier.

FIG. 7 is a flowchart illustrating an embodiment of a process for dynamically encoding a resource identifier. The process of FIG. 7 may be implemented on client 110 of FIG. 4. For example, at least a portion of the process of FIG. 7 is implemented using virtualization client component 120 and/or web browser 112 of FIG. 4. In some embodiments, the process of FIG. 7 is repeated for each intercepted request for a resource of a plurality of dependent resources of a web content (e.g., dependent resources of a webpage). In some embodiments, at least a portion of the process of FIG. 7 is included in 510 of FIG. 5.

At 702, a request associated with a resource of web content is intercepted. In some embodiments, the request is a request for an external dependent resource of web content (e.g., webpage) received in 504 of FIG. 5. Examples of resources include a file, an image, a script, a JavaScript, a script element, a web program, a style sheet language object (e.g., CSS file), and other content elements to be obtained to render the web content. In some embodiments, the interception of the request is performed by a virtualization client (e.g., component 120 of FIG. 4). For example, the virtualization client is a JavaScript program that has been inserted into a webpage to intercept method/function calls associated with resource identifiers.

The virtualization client may facilitate one or more wrapper methods/functions with respect to one or more of the APIs of the DOM (e.g., Document API interface of a webpage) that replace and wrap corresponding standard APIs methods/functions of the DOM (e.g., method API calls to create, delete or update elements in the DOM via a Document API interface are replaced with corresponding wrapper methods). For example, for a particular memory address locations identifying standard code of DOM API (e.g., Document API) methods/calls are replaced with memory address locations of replacement wrapper methods/functions provided via the virtualization client. In some embodiments, DOM core level 1 APIs for manipulating the DOM tree are supplanted by the equivalent interfaces provided via the virtualization client. In this manner, the virtualization client is able to intercept requests for resources and modify the requests (e.g., transform/encode resource location identifier (e.g., URL) of a request) in a manner that is transparent to other processes running within a web browser environment. In other words, the virtualization client ensures that any other processes running within the web browser only have access to the encoded resource identifiers and thus are unable to determine the original identity (e.g., original location identifier) of resources associated with the web content.

The virtualization client may have been inserted in the webpage in 610 of FIG. 6 that is received in 504 of FIG. 5. In some embodiments, the interception of the request is performed prior to when an unauthorized content modifier (e.g., content modification component 114 of FIG. 4) has access to the request. In some embodiments, intercepting the request includes identifying a resource to be obtained in the modified document object in 508 of FIG. 5. In some embodiments, the intercepted request is a dynamic request (e.g., a request made using a script).

At 704, it is determined whether to encode a resource identifier of the resource. In some embodiments, the resource identifier of the resource is to be transformed if the resource is known or vulnerable to be targeted by an unauthorized content modifier. The identifier of the resource is then selected for encoding to prevent the third-party content modifier from recognizing the resource. For example, resources of one or more specified types (e.g., specific file type, script, advertisement, etc.) are selected for identifier transformation/encoding. In another example, resources that are to be obtained from one or more specified Internet domains (e.g., a domain name included in a resource identifier of the resource matches an entry in a data structure) or servers are selected for identifier encoding. In some embodiments, the identifier of the resource is to be transformed even if the resource is known to be not vulnerable or not targeted by an unauthorized content modifier. For example, by also transforming identifiers of resources that the unauthorized content modifier does not desire to modify/block, the third-party content modifier is unable to simply block/modify all requests for resources with encoded/obfuscated identifiers and is also unable to take a whitelist approach of only allowing requests for resources with known/recognized identifiers. In some embodiments, it is determined to not encode the identifier of the resource if the identifier has been already encoded (e.g., transformed/encoded in 608 of FIG. 6). In some embodiments, every intercepted resource identifier of a web content (e.g., webpage) is to be transformed if it has not been already transformed. Examples of the resource identifier include a Uniform Resource Identifier (URI), a Uniform Resource Locator (URL), a network path, a location address, a storage location and any other content identifier.

If at 704 it is determined that the resource identifier is to be encoded, at 706, the identifier of the resource is encoded. For example, encoding the resource identifier includes modifying at least a portion of character contents of the resource identifier. The resource identifier may include a URI and at least a portion of the URI is encoded to obfuscate the URI. In some embodiments, encoding the resource identifier includes encrypting at least a portion of the resource identifier. For example, the resource identifier is encrypted using a public key of a public key cryptography that can be only decrypted using a private key corresponding to the public key. In some embodiments, the key utilized to encrypt the resource identifier is specific to a content provider of the resource identified by the resource identifier, a recipient (e.g., client) of the resource, an intermediary server performing the encryption, a resource type of the resource, and/or a network/domains/URI of the resource identifier. In some embodiments, the key utilized to encrypt the resource identifier is common across various different content providers, recipients (e.g., clients), intermediary servers performing the encryption, resource types, and/or network/domains/URIs. In some embodiments, the key utilized to encrypt the resource identifier is automatically changed over time. For example, in order to prevent an unauthorized content modifier from learning a pattern of the encryption, the encryption key is changed periodically. In some embodiments, encoding the resource identifier includes hashing at least a portion of the resource identifier. For example, a hash value is determined as the transformed identifier using a hashing function and the original resource identifier is stored in a corresponding hash table. In some embodiments, the original resource identifier is stored in a table, a database, or other data structure to be utilized to determine the original resource identifier from the transformed identifier. In some embodiments, the encoding the resource identifier includes encoding the resource identifier in a manner that preserves one or more special characters included in the original resource identifier in the encode version of the original resource identifier in a manner as further described in this document.

At 708, the request is allowed to proceed. For example, the received request is allowed to proceed using the encoded identifier of the resource by having the wrapper method/function that utilized to intercept the request, invoke the corresponding standard DOM API call using the encoded identifier (e.g., pass the encoded identifier as a parameter to the standard DOM API call). In some embodiments, allowing the request includes creating/updating a DOM object using the encoded identifier. In some embodiments, allowing the request includes sending the request for the resource via a network to an intermediary server (e.g., server system 150 of FIG. 4) or directly to a content provider (e.g., content provider 130 of FIG. 4) to allow the encoded identifier of the resource to be translated back to its original identifier for identification and retrieval of the resource. In some embodiments, allowing the request includes allowing the resource of a modified document object model structure to be requested and received in 510 of FIG. 5.

Figure 8:
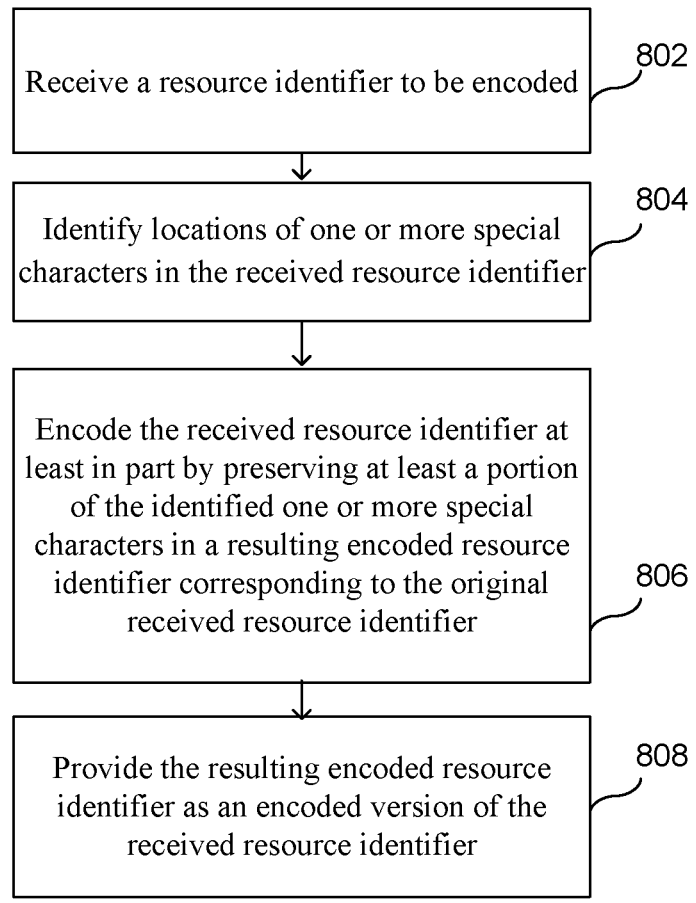
FIG. 8 is a flowchart illustrating an embodiment of encoding an identifier in a manner that preserves special characters in an encoded version of the identifier.

FIG. 8 is a flowchart illustrating an embodiment of encoding an identifier in a manner that preserves special characters in an encoded version of the identifier. At least a portion of the process of FIG. 8 may be implemented on server system 150 and/or content provider 130 of FIG. 4. For example, at least a portion of the process of FIG. 8 is utilized to preserve special character format of a static resource identifier to be encoded in a web content prior to delivery to a web browser. At least a portion of the process of FIG. 8 may be implemented on client 110 via component 120 of FIG. 4. For example, at least a portion of the process of FIG. 8 is utilized to preserve a special character format of a dynamic resource identifier intercepted by a virtualization client. In some embodiments, at least a portion of the process of FIG. 8 is included in 508 (e.g., utilized by a virtualization client to encode and preserve special characters of a resource identifier of the original requested web content) and/or 510 of FIG. 5 (e.g., utilized by a virtualization client to encode and preserve special characters of a resource identifier detected in an intercepted request). In some embodiments, at least a portion of the process of FIG. 8 is included in 608 of FIG. 6. In some embodiments, at least a portion of the process of FIG. 8 is included in 706 of FIG. 7.

At 802, a resource identifier to be encoded is received. Examples of the resource identifier include at least a portion of: a URL, a URI, a file location, a storage location and any other network or storage location. In some embodiments, the resource identifier is a resource identifier specified in the original requested web content obtained by a virtualization client in 508 of FIG. 5 to produce the modified document object model structure. In some embodiments, the received resource identifier is a resource identifier detected (e.g., intercepted) in a request for a resource in 510 of FIG. 5. In some embodiments, the resource identifier is a resource identifier selected in 606 of FIG. 6 for transformation. In some embodiments, the resource identifier is the identifier of the resource included in the request intercepted in 702 of FIG. 7.

Figure 9:
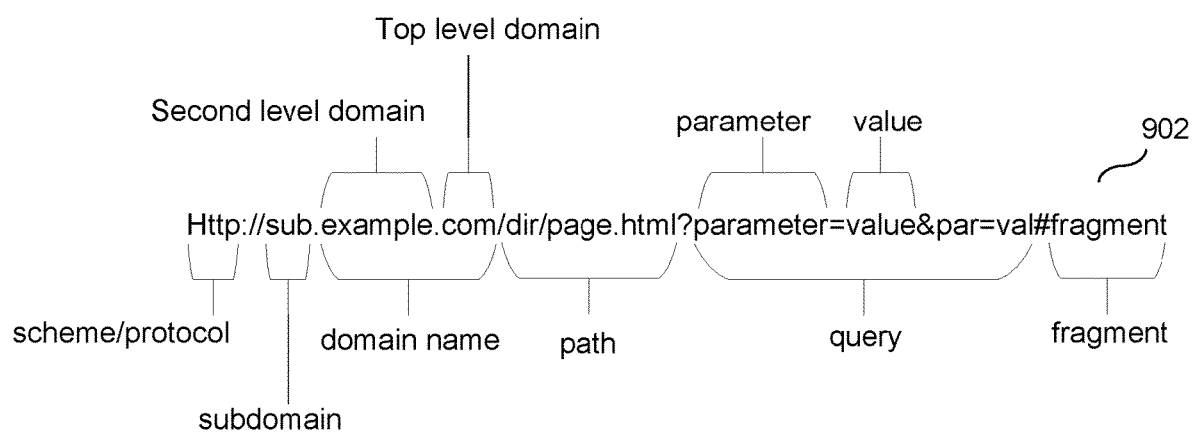
FIG. 9 shows example components of an example URI.

In some embodiments, the resource identifier includes at least a portion of a URI. A URI may include many components and components of example URI 902 are shown and labeled in FIG. 9. As shown in the example, the different components of the URI are separated from one another by a special character. Special characters "://" separate the scheme/protocol identifier from the subdomain and domain name; the "." special character separates identifiers of different domain levels, the "/" special character separates elements of the path; the "?" special character identifies a beginning of the query component; the "=" special character identifies the beginning of a value corresponding to the preceding parameter included in the query component; the "&" special character separates different parameter and value pairs in the query component; and the "#" special character identifies the beginning of the fragment component. The URI shown in FIG. 9 is merely an example and other combinations of components and special characters exist in other examples. Because the special characters are utilized to identify components, structure and/or component relationships of a resource identifier, code of a web content that includes the resource identifier may rely on the existence of these special characters. For example, when extracting information from a resource identifier, special characters included in the resource identifier are utilized to identify a desired component to be extracted from the resource identifier.

If during encoding of the resource identifier its special characters also become obfuscated (e.g., entire resource identifier is encrypted together to result in a single obfuscated encoded resource identifier), code of the web content that relies on the existence of the special characters to identify relevant components/portions of the resource identifier is unable to function correctly if the original resource identifier is replaced with the encoded version of the resource identifier without the special characters.

In some instances, web content may reference a resource using a relative reference to a URI path in a resource identifier. Because this relative reference is in reference to the original not encoded URI, the encoded resource identifier needs to be decoded back to the original resource identifier prior to applying the relative path. Otherwise, an incorrect URI may result from applying a relative reference intended for the not encoded URI to an encoded URI without preserved special characters. In one example, a current path/URI associated with a specified resource identifier is "http://www.example.com/a/b/c". Code of the web content may reference another resource located at a desired URI "http://www.example.com/a/file1.htm" by specifying relative path "../../file1.htm". The identifier ".." identifies a higher path level of the current path. In order to arrive at this desired URI using the relative path, the path of the current path/URI may be modified by removing each successive path level for each specified ".." (e.g., each successive path level in the current path/URI identified by identifying special characters "/" in the current path/URI) and appending any specified additional paths. However, if the current path/URI is from an encoded resource identifier that has not preserved its special character format, the code of the web content may mutilate or mix the encoded resource identifier using the relative path for a not encoded resource identifier and arrive at the resulting modified mixed identifier that is invalid. Although it would be desirable to intercept and translate any encoded resource identifier back to its original identifier prior to allowing it to be modified using a relative path, in certain situations, it may not be possible to intercept or translate the encoded resource identifier prior to the modification.

At 804, locations of one or more special characters in the received resource identifier are identified. For example, the received resource identifier is searched to locate locations of any specials characters from a list of special characters to identify special character formatting and structure to be preserved in an encoded form of the resource identifier. Examples of the special characters include: ":", ".", "/", "\", "?", "&", "#" and "=". In some embodiments, each of the special characters to be identified is a single character. In some embodiments, identifying locations of one or more special characters includes identifying a group of special characters that matches a specified pattern (e.g., identify "://"). The special characters separate logical components and define relationships of the logical components. For example, the special the special characters define a structure, a hierarchy, a format and/or components of the content location address are identified in the original content location address to identify formatting and structure of the original content location address to be preserved in an encoded form of the content location address. In some embodiments, specific components and/or portions of the resource identifier are identified based on the identified special characters. For example, based on the location and type of the identified special characters, sets of characters (e.g., string) included in the resource identifier that correspond to different components are determined. The identified components may belong to one or more of the component types shown in the example of FIG. 9. For example, character contents of the resource identifier located between identified special characters are identified as a component and categorized as one of the component types based on a location of the component with respect to locations of the identified special characters and the locations of other identified components within the resource identifier.

At 806, the received resource identifier is encoded at least in part by preserving at least a portion of the identified one or more special characters in a resulting encoded resource identifier corresponding to the original received resource identifier. In some embodiments, the received resource identifier is encoded at least in part by preserving at least some of the identified special characters in the resulting encoded location address corresponding to the original resource identifier. For example, one or more of the identified special characters are included in the resulting encoded resource identifier (e.g., included in the same relative order the included special characters were located to each other in the received resource identifier) to preserve the special character structure of the original resource identifier in the resulting encoded resource identifier.

In some embodiments, one or more of the individual components of the received resource identifier between identified locations of the special characters are individually encoded. In one example, an original identifier "http://xyz.abc.com/dir1/index.htm?search" is transformed as "http://ljfoo8iD.NewDomain.com/alsdjfa/asdkvljle?1-skfsld." In other words, if f(x) represents an encoding of "x," the encoding of the original identifier is represented as http://f(xyz.abc.com).NewDomain.com/f(dir1)/f(index.htm)?f(search), where the redirected domain name of the encoded resource identifier is "NewDomain.com". In this example, the order, value/type and number of the special characters (e.g., with respect to each other) are preserved and corresponding encoded versions of components between and around the special characters are included in the encoded resource identifier. In the event this transformed identifier is modified using a relative path, any removed element does not break the entire transformation and any added element may be detected (e.g., added element is detected as not encoded). This allows the individual elements/portions of the encoded identifier to be translated back to the corresponding original portions of the original identifier. In some embodiments, certain identified components/portions of the original resource identifier are not encoded in the resulting encoded resource identifier. For example, a query component of the received resource identifier is not encoded to allow code of web content to access and modify contents of the query component in its original form. The scheme/protocol component of the received resource identifier, if present, identifies the protocol to be utilized and may be preserved and/or modified to a different scheme/protocol corresponding to a network communication with the server of the redirected domain name of the encoded resource identifier.

In some embodiments, rather than individually encoding individual components of the original resource identifier, a larger portion including one or more special characters is encoded together as a single encoded portion. For example, the original resource identifier is encoded together in its entirety (e.g., original resource identifier may be modified to remove or add scheme/protocol information prior to encoding).

By encoding together more characters together, the actual identity of the original resource identifier is better hidden/obfuscated since there is less chance that commonality in encoding patterns will be detected by unauthorized content modifiers. However, in order to preserve the special character formatting of the original resource identifier in the encoded resource identifier, placeholder special character content (e.g., dummy content) is added (e.g., appended) to the encoded resource identifier. For example, at least a portion of the format of at least a portion of the special characters in the original resource identifier is reproduced and appended to the encoded resource identifier to include a representation of a format of the special characters of the original resource identifier. By detecting modifications to the appended placeholder special character content portion, modifications to the encoded resource identifier may be detected and the detected modifications may be applied to the corresponding decoded resource identifier to determine a not encoded modified version.

In some embodiments, the placeholder special character content appended to an end of the encoded resource identifier only reproduces the special characters and format of a path component and/or a fragment component of the original resource identifier. In some embodiments, a placeholder special character content added to a subdomain of the encoded resource identifier only reproduces the special characters and format of a subdomain component of the original resource identifier.

In an example, identifier "http://sub1.sub2.abc.com/dir1/index.htm?search" is transformed as "http://$1.$2.NewDomain.com/sdfs3iukjlkJk/$3/$4?$5", where "$"+counter value is the content filler between special characters in the added placeholder content. By using a different content filler between special characters (e.g., using an incremented counter value), any modification to the content filler in the added placeholder can be specifically identified. In other terms, if f(x) represents an encoding of "x", the encoding of the original resource identifier is represented as "http://'added sub-domain format'.NewDomain.com/f(http://sub1.sub2.abc.com/dir1/index.htm?search)/'added path format'", where the redirected domain of the transformed identifier is "NewDomain.com". The 'added path format' reproduces the ordering and number/type of special characters in the path portion of the original identifier by reproducing the special characters in the path of the original received resource identifier along with one or more dummy content fillers (e.g., "$" character) representing the non-special character portions of the path of the received resource identifier between/around the special character(s). The 'added sub-domain format' reproduces the ordering and number/type of special characters in the subdomain portion of the original received resource identifier by reproducing the special characters in the sub-domain of the original identifier along with one or more dummy content fillers (e.g., "$" character) representing the non-special character portions of the subdomain of the received resource identifier between/around the special character(s).

In some embodiments, encoding the received resource identifier includes identifying a redirected domain name and/or subdomain to be utilized in the resulting encoded resource identifier. For example, the redirected domain name and/or subdomain corresponds to a specific intermediary server (e.g., server system 150 of FIG. 4) that will handle the translation of the encoded identifier back to the original resource identifier and proxy the content located at the location address of the original resource identifier. There may exist a plurality of different intermediary servers and each different intermediary server may be assigned to handle content for certain assigned domains of original resource identifiers (e.g., each intermediary server may cache content for different domains). In some embodiments, identifying the redirected domain name and/or subdomain to be utilized includes identifying the redirected domain name and/or subdomain corresponding to the domain name and/or sub-domain of the original resource identifier. A data structure (e.g., a table, a database, a chart, a hash table, a list, a spreadsheet, etc.) that includes entries that each map a different domain name and/or subdomain to a redirected domain name and/or subdomain may be utilized. In some embodiments, this data structure is received in 508 of FIG. 5. In some embodiments, rather than using a data structure, a default redirected domain and/or subdomain is utilized. In some embodiments, a subdomain of the encoded identifier is an encoding of the domain name and/or subdomain of the original resource identifier.

In some embodiments, the encoding of at least a portion of the received resource identifier is performed such that a result of the encoding cannot include any special characters. For example, a symbol set utilized to represent the result has been selected to not include any of the specified special characters. In some embodiments, performing encoding of the received resource identifier, in component parts, or in entirety, includes performing encryption of the character(s) to be encoded. For example, the resource identifier is encrypted using a public key of a public key cryptography that can be only decrypted using a private key corresponding to the public key. In some embodiments, the key utilized to encrypt the resource identifier is specific to a content provider of a resource referenced by the resource identifier, a recipient (e.g., client) of the resource, an intermediary server performing the encryption, a resource type, and/or a network/Internet domain/URI of the resource. In some embodiments, the key utilized to encrypt the resource identifier is common across various different content providers, recipients (e.g., clients), intermediary servers performing the encryption, resource types, and/or network/Internet domains/URIs. In some embodiments, the key utilized to encrypt the resource identifier is automatically changed over time. For example, in order to prevent a third-party content modifier from learning a pattern of the encryption, the encryption key is changed periodically. A new encryption key (e.g., public key) may be received or obtained from a server periodically. In some embodiments, encoding the resource identifier includes hashing at least a portion of the resource identifier. For example, a hash value determined using a hashing function is utilized as at least a portion of the encoded resource identifier and the original received resource identifier is stored in a corresponding hash table. In some embodiments, the original received resource identifier is stored in a table, a database, or other data structure to be utilized to identify the original resource identifier from the encoded resource identifier At 808, the resulting encoded resource identifier is provided as an encoded version of the received resource identifier. For example, the received resource identifier is replaced with the encoded resource identifier. In some embodiments, the encoded resource identifier is provided for use in 508 and/or 510 of FIG. 5. In some embodiments, the encoded resource identifier is provided for use in 608 of FIG. 6. In some embodiments, the encoded resource identifier is provided for use in 706 of FIG. 7.

Figure 10:
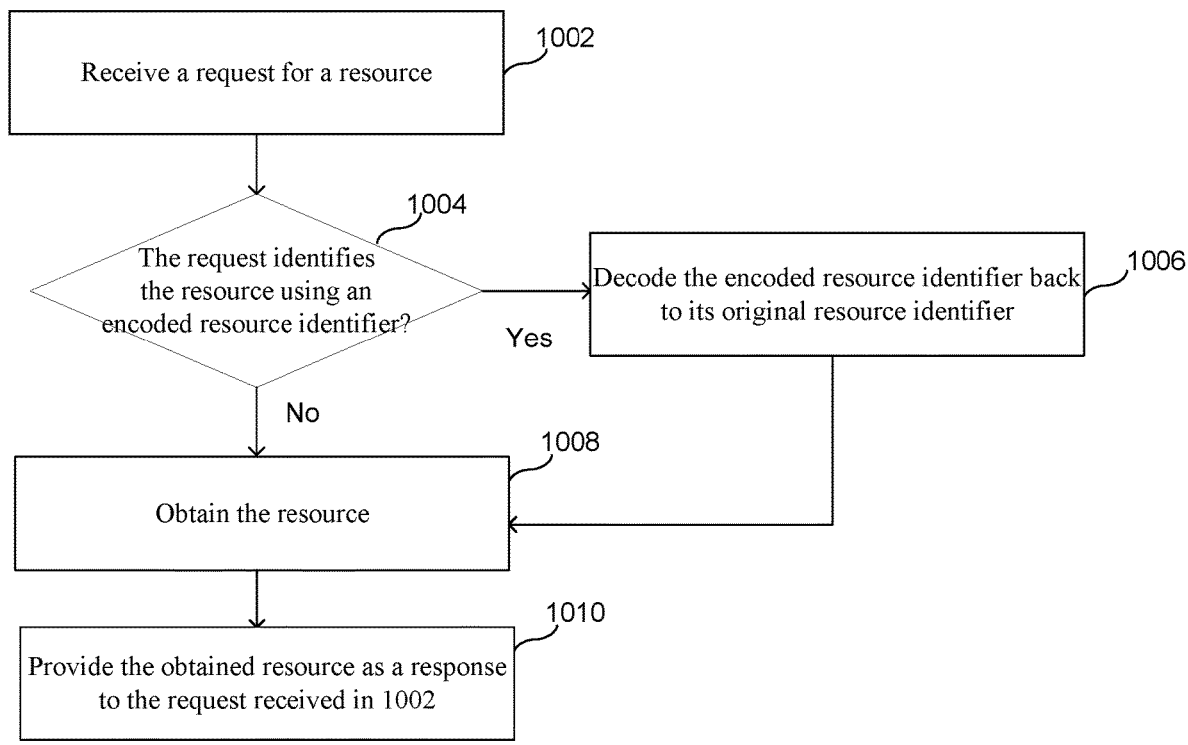
FIG. 10 is a flowchart illustrating an embodiment of a process for providing a resource in response to a request.

FIG. 10 is a flowchart illustrating an embodiment of a process for providing a resource in response to a request. The process of FIG. 10 may be implemented on server system 150 and/or content provider 130 of FIG. 4.

At 1002, a request for a resource is received. In some embodiments, the received request is the request provided in 510 of FIG. 5 or allowed in 708 of FIG. 7. For example, the requested resource is a dependent resource of a webpage.

At 1004, it is determined whether the request identifies the resource using a transformed/encoded resource identifier. For example, it is determined whether the identifier of the resource included in the request is an encrypted, hashed, or otherwise obfuscated/protected resource identifier.

If at 1004 it is determined that the request identifies the resource using a transformed/encoded resource identifier, at 1006, the transformed/encoded resource identifier is translated/decoded back to its original resource identifier. In some embodiments, translating the encoded resource identifier includes decrypting at least a portion of the encoded resource identifier. For example, the encoded resource identifier has been encrypted using a public key of a public key cryptography and is decrypted using a private key corresponding to the public key. In some embodiments, the key utilized to decrypt the encoded resource identifier is specific to a content provider of the resource referenced by the resource identifier, a recipient (e.g., client) of the resource, an intermediary server performing the encryption, a resource type, and/or a network/domain/URI of the resource. In some embodiments, the key utilized to decrypt the resource identifier is common across various different content providers, recipients (e.g., clients), intermediary servers performing the encryption, resource types, and/or network/Internet domains/URIs. In some embodiments, the key utilized to decrypt the resource identifier is automatically changed over time to correspond to the change in the encryption key. In some embodiments, translating the resource identifier includes using at least a portion of the transformed identifier as the hash value and obtaining the original identifier from a hash table. In some embodiments, the original resource identifier has been stored in a table, a database, or other data structure to be utilized to determine the original resource identifier from the encoded resource identifier. For example, at least a portion of the encoded resource identifier is utilized to perform a lookup of the data structure to find an entry storing at least a portion the original resource identifier.

At 1008, the resource is obtained. In some embodiments, the resource is obtained using the translated/decoded resource identifier determined in 1006. The resource may be obtained from a cache of an intermediary server. In some embodiments, the resource is obtained by requesting and receiving the resource via a network from a content server (e.g., from content provider 130) using a URI content of the translated/decoded resource identifier.

At 1010, the obtained resource is provided as a response to the request received in 1002. In some embodiments, the provided response of 1010 is received in 510 of FIG. 5.

Figure 11:
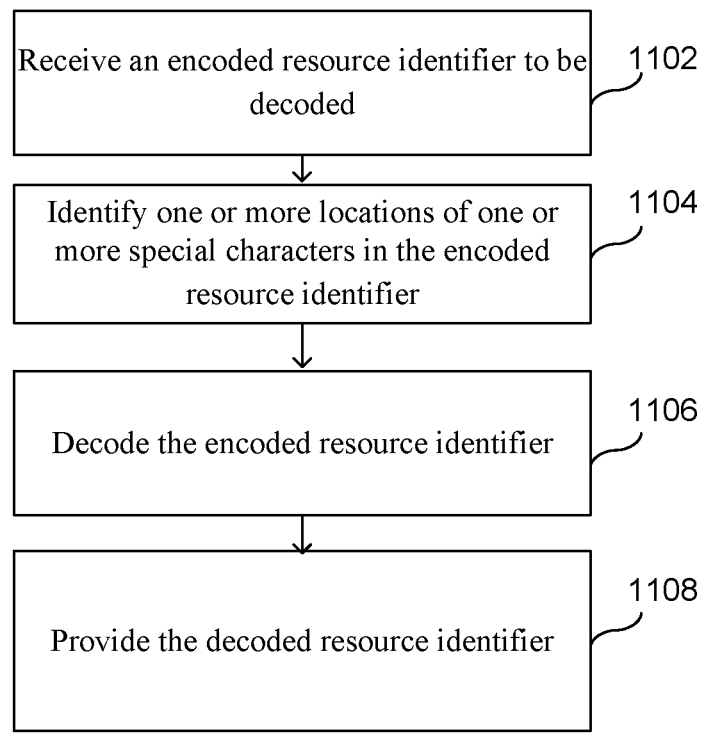
FIG. 11 is a flowchart illustrating an embodiment of decoding an encoded resource identifier that preserved one or more special characters of a corresponding original resource identifier.

FIG. 11 is a flowchart illustrating an embodiment of decoding an encoded resource identifier that preserved one or more special characters of a corresponding original resource identifier. At least a portion of the process of FIG. 11 may be implemented on server system 150 and/or content provider 130 of FIG. 4. For example, at least a portion of the process of FIG. 11 is utilized to decode an encoded resource identifier of a resource request received from a web browser. In some embodiments, at least a portion of the process of FIG. 11 is included in 1006 of FIG. 10.

At 1102, an encoded resource identifier to be decoded is received. In some embodiments, the encoded resource identifier was encoded using the process of FIG. 8. In some embodiments, the encoded resource identifier is the transformed/encoded resource identifier to be decoded in 1006 of FIG. 10.

At 1104, one or more locations of one or more special characters in the encoded resource identifier are identified. For example, received encoded resource identifier is searched to locate locations of any specials characters from a list of special characters. Examples of the special characters include one or more of the following: ":", ".", "/", "\", "?", "&", "#" and "=". In some embodiments, specific components and/or portions of the encoded resource identifier are identified based on the identified special characters. For example, based on the location and type of the identified special characters, sets of characters (e.g., string) included in the encoded resource identifier that correspond to different components are determined.

At 1106, the encoded resource identifier is decoded. In some embodiments, if the encoded resource identifier was generated by individually encoding different components of the corresponding original resource identifier without encoding special characters, each group of groups of non-special characters between the special characters identified in 1104 is individually decoded together as a group, if applicable. A group of non-special characters between the identified special characters does not have to be decoded if it is detected as not encoded. For example, during the encoding process, certain groups of characters may have been included in the encoded resource identifier without encoding. In another example, code of web content may have appended non-encoded components to the encoded resource identifier and these appended non-encoded components do not have to be decoded. In some embodiments, decoding the resource identifier includes replacing the domain name and/or subdomain of the encoded resource identifier with the original domain name and/or subdomain identified as a result of decoding a subdomain of the encoded resource identifier.

In some embodiments, the encoded resource identifier includes at least a portion that can be decoded to obtain the entire corresponding original resource identifier. However, if the encoded resource identifier is detected (e.g., detected using information identified in 1104) as including one or more placeholder special character content (e.g., placeholder added in 806 of FIG. 8), the decoded result original resource identifier is modified to apply any changes identified in the detected placeholder special character content. For example, code of web content may have added characters to the placeholder special character content and/or removed portions of the placeholder special character content and these changes may be detected by comparing the detected placeholder special character content with an original placeholder special character content corresponding to the original resource identifier. In some embodiments, special characters in the detected placeholder special character content are identified and compared with special characters in the decoded result original resource identifier to identify added characters to the placeholder special character content and/or removed portions of the placeholder special character content. The detected added characters may be added to the decoded result original resource identifier at a corresponding appropriate location and a portion of the decoded result original resource identifier corresponding to the detected removed portion of the placeholder special character content is removed from the decoded result original resource identifier.

In some embodiments, decoding the encoded resource identifier includes decrypting at least a portion of the encoded resource identifier. For example, the encoded resource identifier has been encrypted using a public key of a public key cryptography and is decrypted using a private key corresponding to the public key. In some embodiments, the key utilized to decrypt the encoded resource identifier is specific to a content provider of a resource referenced by the encoded resource identifier, a recipient (e.g., client) of the resource, an intermediary server performing the encryption, a resource type, and/or a network/Internet domain/URI of the resource. In some embodiments, the key utilized to decrypt the encoded resource identifier is common across various different content providers, recipients (e.g., clients), intermediary servers performing the encryption, resource types, and/or network/Internet domains/URIs. In some embodiments, the key utilized to decrypt the encoded resource identifier is automatically changed over time to correspond to the change in the encryption key. In some embodiments, decoding the encoded resource identifier includes using at least a portion of the encoded resource identifier as the hash value and obtaining the original identifier from a hash table. In some embodiments, the original resource identifier has been stored in a table, a database, or other data structure to be utilized to determine the original resource identifier from the encoded resource identifier. For example, at least a portion of the encoded resource identifier is utilized to perform a lookup of the data structure to find an entry storing at least a portion of the original resource identifier.

At 1108, the decoded resource identifier is provided. For example, the decoded resource identifier is utilized in 1008 of FIG. 10 to obtain the resource identified by the decoded resource identifier.

According to some embodiments, rather than performing resource identifier transformation by default, resource identifier transformation is only performed by the virtualization client 120 when it is detected that the web browser 112 comprises content modification functionality. For example, existence/operation/installation of a third-party program/plug-in that is modifying, adding, or blocking at least a portion of content resources is detected and resource identifier transformation/obfuscation is only performed upon detection of the third-party content modifier (e.g., content blocker). The detection may be performed using an included program/script in the web content to detect whether certain content components are configured or installed for the web browser 112. In this manner, resource identification transformation is only performed when required, thereby reducing processing load for the web browser 112.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   detecting by a hardware processor that a web browser has a corresponding content modification component;
   responsive to detecting that the web browser has the content modification component, detecting a resource identifier to be encoded, wherein the resource identifier comprises an identifier that enables the web browser to retrieve and locate a resource;
   circumventing by the hardware processor the content modification component with the web browser by:
   identifying one or more special characters in the detected resource identifier, wherein the one or more special characters are other than alphanumeric characters and whose position within the detected resource identifier separate logical components and define relationships of the logical components within the detected resource identifier;
   encoding the detected resource identifier at least in part by preserving the identified one or more special characters in a resulting encoded resource identifier corresponding to the detected resource identifier, wherein preserving includes incorporating at least some of the identified one or more special characters in the resulting encoded resource identifier and in a same order that the at least some of the identified one or more special characters occur in the detected resource identifier; and wherein the detected resource identifier is different from the resulting encoded resource identifier; and
   utilizing the encoded resource identifier in place of the detected resource identifier to prevent the content modification component from compromising integrity of the resource identified by the detected resource identifier.

2. The method of claim 1, wherein the resource identifier includes at least a portion of a URI.

3. The method of claim 1, wherein the special characters identify separations between logical components of the resource identifier and the special characters include one or more of the following: ":", ".", "/", "?", "&", "#" and "=".

4. The method of claim 1, wherein detecting the resource identifier includes identifying the detected resource identifier in a webpage file.

5. The method of claim 1, wherein the detected resource identifier is detected using a virtualization client included in an alternative version of a webpage provided to a web browser in response to a request for the webpage.

6. The method of claim 1, wherein detecting the resource identifier includes intercepting a Document Object Model API method call that utilizes the detected resource identifier.

7. The method of claim 1, wherein detecting the resource identifier includes identifying the resource identifier as a static resource identifier that is specified in a non-script portion of an HTML file.

8. The method of claim 1, wherein identifying the one or more special characters includes identifying types and relative locations between the one or more special characters identified in the detected resource identifier.

9. The method of claim 1, wherein identifying the one or more special characters includes identifying only a portion of all special characters included in the detected resource identifier and the portion corresponds to special characters to be preserved.

10. The method of claim 1, wherein encoding the detected resource identifier includes encrypting at least a portion of the detected resource identifier.

11. The method of claim 1, wherein encoding the detected resource identifier includes hashing at least a portion of the detected resource identifier.

12. The method of claim 1, wherein encoding the detected resource identifier includes encoding characters between two identified special characters in the detected resource identifier while not encoding the two identified special characters.

13. The method of claim 1, wherein encoding the detected resource identifier includes identifying a domain name to be included in the encoded resource identifier and the domain name corresponds to an intermediary server that will decode the encoded resource identifier.

14. The method of claim 1, wherein encoding the detected resource identifier includes encoding the entire detected resource identifier to generate an encoded value that is included in the encoded resource identifier and appending to the encoded resource identifier an added placeholder special character content that includes the identified one or more special characters.

15. The method of claim 1, wherein utilizing the encoded resource identifier in place of the detected resource identifier includes replacing the detected resource identifier with the encoded resource identifier in a web content.

16. A system, comprising: a processor configured to:
   detect that a web browser has a corresponding content modification component;
   in response to a detection that the web browser has the content modification component, detect a resource identifier to be encoded, wherein the resource identifier comprises an identifier that enables the web browser to retrieve and locate a resource;

circumvent the content modification component with the web browser by:

identifying one or more special text characters in the detected resource identifier, wherein the one or more special text characters are other than alphanumeric characters and whose position within the detected resource identifier separate logical components and define relationships of the logical components within the detected resource identifier;

encoding the detected resource identifier at least in part by preserving the identified one or more special text characters in a resulting encoded resource identifier corresponding to the detected resource identifier, wherein preserving includes incorporating at least some of the identified one or more special characters in the resulting encoded resource identifier and in a same order that the at least some of the identified one or more special characters occur in the detected resource identifier, and wherein the detected resource identifier is different from the resulting encoded resource identifier; and utilizing the encoded resource identifier in place of the detected resource identifier to prevent the content modification component from compromising integrity of the resource identified by the detected resource identifier; and a memory coupled to the processor and configured to provide the processor with instructions.

* * * * *